(12) United States Patent
Moalemi et al.

(10) Patent No.: US 12,451,292 B2
(45) Date of Patent: Oct. 21, 2025

(54) CERAMIC MICROELECTRONIC DEVICES AND METHODS OF THEIR MANUFACTURE

(71) Applicant: Eulex Components Inc, San Diego, CA (US)

(72) Inventors: Ali Moalemi, San Diego, CA (US); Euan Patrick Armstrong, Vienna, VA (US)

(73) Assignee: Eulex Components Inc, San Diego, CA (US)

( * ) Notice: Subject to any disclaimer, the term of this patent is extended or adjusted under 35 U.S.C. 154(b) by 46 days.

(21) Appl. No.: 16/915,886

(22) Filed: Jun. 29, 2020

(65) Prior Publication Data

US 2020/0411250 A1 Dec. 31, 2020

Related U.S. Application Data

(60) Provisional application No. 62/867,786, filed on Jun. 27, 2019.

(51) Int. Cl.
*H01G 4/30* (2006.01)
*H01G 4/005* (2006.01)
(Continued)

(52) U.S. Cl.
CPC ............... *H01G 4/30* (2013.01); *H01G 4/005* (2013.01); *H01G 4/1209* (2013.01); *H01G 4/40* (2013.01)

(58) Field of Classification Search
CPC .......... H01G 4/30; H01G 4/1209; H01G 4/40; H01G 4/005; H10G 4/005
(Continued)

(56) References Cited

U.S. PATENT DOCUMENTS

| 4,568,999 A | 2/1986 | Larowe et al. |
| 4,685,197 A | 8/1987 | Riemenschneider et al. |

(Continued)

FOREIGN PATENT DOCUMENTS

| CN | 1314686 A | 9/2001 |
| CN | 204270875 U | 4/2015 |

(Continued)

OTHER PUBLICATIONS

International Preliminary Report on Patentability for International Application No. PCT/US2013/067375, Report issued Oct. 30, 2014, Mailed Nov. 7, 2014, 10 Pgs.

(Continued)

*Primary Examiner* — Arun Ramaswamy
(74) *Attorney, Agent, or Firm* — KPPB LLP

(57) ABSTRACT

Microelectronics having form factors (e.g., dimensions and functionality) comparable with traditional microelectronics, but with considerably simplified design, and their methods of manufacture are provided. Microelectronics and methods that implement microelectronics are capable of being forming without the need for through-vias. Exemplary dielectrics in these embodiments include, but are not limited to, high Q, temperature stable and high k dielectrics. Microelectronics and methods are capable of combination with any other passive electronic component such as a resistor or inductor further improving functionality and reducing space requirements on the circuit. Microelectronics and methods are configured to be mounted to a short block or other device without the use of a through-via, simplifying connection to a circuit.

26 Claims, 16 Drawing Sheets

(51) Int. Cl.
*H01G 4/12* (2006.01)
*H01G 4/40* (2006.01)

(58) Field of Classification Search
USPC ............ 361/301.4, 301.3, 321.1, 306.3, 303, 361/321.4, 321.3, 311
See application file for complete search history.

(56) References Cited

U.S. PATENT DOCUMENTS

| | | | |
|---|---|---|---|
| 5,018,048 A * | 5/1991 | Shaw | B05D 7/56 29/25.42 |
| 5,144,526 A | 9/1992 | Vu et al. | |
| 5,465,008 A | 11/1995 | Goetz et al. | |
| 5,745,335 A | 4/1998 | Watt | |
| 5,757,611 A | 5/1998 | Gurkovich et al. | |
| 6,291,272 B1 | 9/2001 | Giri et al. | |
| 6,336,269 B1 | 1/2002 | Eldridge et al. | |
| 6,452,781 B1 | 9/2002 | Ahiko et al. | |
| 6,532,143 B2 | 3/2003 | Figueroa et al. | |
| 6,542,352 B1 | 4/2003 | Devoe et al. | |
| 6,606,237 B1 * | 8/2003 | Naito | H01G 4/232 361/306.3 |
| 6,724,611 B1 | 4/2004 | Mosley | |
| 6,751,082 B2 | 6/2004 | Devoe et al. | |
| 6,822,847 B2 * | 11/2004 | Devoe | H01G 4/33 361/306.1 |
| 6,831,824 B1 | 12/2004 | Devoe et al. | |
| 6,906,910 B1 | 6/2005 | Gilliland et al. | |
| 6,961,231 B1 | 11/2005 | Alexander et al. | |
| 7,035,080 B1 | 4/2006 | Devoe et al. | |
| 7,102,874 B2 * | 9/2006 | Jow | H01G 4/012 361/301.4 |
| 7,149,072 B2 | 12/2006 | Lee et al. | |
| 7,312,975 B2 | 12/2007 | Togashi et al. | |
| 7,511,939 B2 | 3/2009 | Wilson et al. | |
| 7,586,174 B2 * | 9/2009 | Togashi | H01G 4/232 257/532 |
| 7,602,599 B1 | 10/2009 | Hsu | |
| 7,710,710 B2 | 5/2010 | Brunner et al. | |
| 7,869,187 B2 | 1/2011 | Mckinzie, III | |
| 8,008,161 B2 | 8/2011 | Bachmann et al. | |
| 8,102,223 B2 | 1/2012 | Umemoto et al. | |
| 8,369,064 B2 | 2/2013 | Ichiyanagi et al. | |
| 8,395,881 B2 | 3/2013 | Togashi | |
| 8,995,109 B1 * | 3/2015 | Tsutsumi | B32B 37/24 361/301.4 |
| 9,299,498 B2 | 3/2016 | Armstrong et al. | |
| 9,390,859 B2 | 7/2016 | Choi et al. | |
| 9,887,465 B2 | 2/2018 | Gummalla et al. | |
| 10,083,909 B2 | 9/2018 | Haba | |
| 10,109,903 B2 | 10/2018 | Huang et al. | |
| 10,283,492 B2 | 5/2019 | Gamini | |
| 10,418,181 B2 | 9/2019 | Moalemi et al. | |
| 2003/0011962 A1 * | 1/2003 | Yamamoto | H01G 4/30 361/321.2 |
| 2003/0063427 A1 | 4/2003 | Kunihiro | |
| 2003/0110621 A1 | 6/2003 | Smyth et al. | |
| 2003/0139016 A1 * | 7/2003 | Watanabe | H01G 4/06 438/393 |
| 2003/0161090 A1 | 8/2003 | Devoe et al. | |
| 2003/0202312 A1 | 10/2003 | Anthony et al. | |
| 2005/0207093 A1 | 9/2005 | Togashi et al. | |
| 2006/0092594 A1 | 5/2006 | Hwang et al. | |
| 2006/0092595 A1 * | 5/2006 | Hwa Lee | H01G 2/065 361/306.3 |
| 2006/0098386 A1 * | 5/2006 | Lee | H01G 4/228 361/301.4 |
| 2006/0198079 A1 | 9/2006 | Shim et al. | |
| 2007/0077687 A1 | 4/2007 | Bothe et al. | |
| 2007/0230088 A1 | 10/2007 | Fujimura et al. | |
| 2008/0062613 A1 | 3/2008 | Wilson et al. | |
| 2009/0045494 A1 | 2/2009 | Langereis et al. | |
| 2009/0059464 A1 | 3/2009 | McKinzie, III | |
| 2009/0128993 A1 | 5/2009 | Wu et al. | |
| 2010/0238603 A1 | 9/2010 | Chung | |
| 2011/0024171 A1 | 2/2011 | Nakamura et al. | |
| 2011/0247186 A1 | 10/2011 | Yu et al. | |
| 2012/0039016 A1 * | 2/2012 | Togashi | H01G 4/35 361/302 |
| 2012/0327554 A1 | 12/2012 | Moalemi et al. | |
| 2013/0038981 A1 | 2/2013 | Imanaka et al. | |
| 2013/0314838 A1 | 11/2013 | Hwang et al. | |
| 2014/0104748 A1 | 4/2014 | Park et al. | |
| 2014/0133065 A1 | 5/2014 | Armstrong et al. | |
| 2015/0070238 A1 | 3/2015 | de Rochemont | |
| 2015/0116902 A1 * | 4/2015 | Sakai | H01G 4/232 361/301.4 |
| 2015/0179555 A1 | 6/2015 | Kim et al. | |
| 2016/0133689 A1 | 5/2016 | Guo et al. | |
| 2016/0155569 A1 | 6/2016 | Masai et al. | |
| 2016/0211079 A1 | 7/2016 | Armstrong et al. | |
| 2016/0219710 A1 | 7/2016 | Park et al. | |
| 2016/0268048 A1 | 9/2016 | Zelner et al. | |
| 2017/0011851 A1 | 1/2017 | Seo et al. | |
| 2017/0042029 A1 * | 2/2017 | Nishimura | H01G 2/06 |
| 2017/0077019 A1 | 3/2017 | Sugaya et al. | |
| 2017/0309405 A1 | 10/2017 | Moalemi et al. | |
| 2018/0102220 A1 * | 4/2018 | Takasaki | H01G 4/005 |
| 2018/0294102 A1 * | 10/2018 | Trinh | H01G 4/30 |
| 2019/0229027 A1 * | 7/2019 | Nomiyama | H01L 25/00 |

FOREIGN PATENT DOCUMENTS

| | | |
|---|---|---|
| JP | 2000133544 A | 5/2000 |
| JP | 2001297942 A | 10/2001 |
| JP | 2006128282 A | 5/2006 |
| WO | 2014078073 A1 | 5/2014 |
| WO | 2015183184 A1 | 12/2015 |
| WO | 2020264519 A1 | 12/2020 |

OTHER PUBLICATIONS

International Search Report and Written Opinion for International Application No. PCT/US2020/040178, Search completed Sep. 14, 2020, Mailed Oct. 8, 2020, 16 Pgs.
International Search Report for International Application No. PCT/US2013/067375, Search completed Mar. 10, 2014, Mailed Mar. 27, 2014, 2 Pgs.
"General & High Cap", Samsung Electro-Mechanics, MLCC (Multi-Layer Ceramic Capacitors), Nov. 7, 2013, retrieved from http://www.samsungsem.com/global/product/passive-component/mlcc/general-n-high-cap/index.jsp.
"Increasing Capacitance of Multilayer Ceramic Chip Capacitors", Tech Web, Sep. 8, 2016, retrieved from http://micro.rohm.com/en/techweb/tech-info/engineer/2578.
Choi et al., "Vialess composite right/left-handed stripline and its applications for broadband 3-dB and tunable couplers", In 2014 44th European Microwave Conference, pp. 315-318. IEEE, 2014.
International Preliminary Report on Patentability for International Application PCT/US2020/040178, Report issued Dec. 28, 2021, Mailed on Jan. 6, 2022, 10 Pgs.

* cited by examiner

Prior Art

501

502

503

901

902

1001

1002

1101  1102

1201  1202

1301

1302

1401

1402

CERAMIC MICROELECTRONIC DEVICES AND METHODS OF THEIR MANUFACTURE

CROSS REFERENCE TO RELATED APPLICATIONS

The current application claims the benefit of and priority under 35 U.S.C. § 119 (e) to U.S. Provisional Patent Application No. 62/867,786 entitled "Ceramic Microelectronic Devices and Methods of Their Manufacture" filed Jun. 27, 2019. The disclosure of U.S. Provisional Patent Application No. 62/867,786 is hereby incorporated by reference in its entirety for all purposes.

FIELD OF THE INVENTION

The current application is related to ceramic microelectronic devices and methods of their manufacture.

BACKGROUND OF THE INVENTION

Microelectronics is a subfield of electronics, and relates to the study and manufacture (or microfabrication) of very small electronic designs and components. Usually, but not always, these devices can contain features of micrometer-scale or smaller. Ceramic microelectronics are microelectronic devices where the support structure and some of the active components are formed from ceramic or glass materials. Co-fired ceramic devices are monolithic, ceramic microelectronic devices where the entire ceramic support structure and any conductive, resistive, and dielectric materials are fired in a kiln at the same time. Typical devices include capacitors, inductors, resistors, transformers, and hybrid circuits. The technology is also used for robust assembly and packaging of electronic components multi-layer packaging in the electronics industry, such as military electronics, MEMS, microprocessor and RF applications.

SUMMARY OF THE INVENTION

Apparatus and methods in accordance with various embodiments of the invention are directed to ceramic microelectronic devices and their method of manufacture. Many embodiments are directed to ceramic microelectronic devices have at least one continuous electrode between at least two layers of ceramic dielectric.

Still any embodiments include a continuous electrode without using conductive paste and/or via in the devices to form a circuit.

Yet many embodiments are directed to microelectronic devices formed with continuous electrode including (but not limited to): capacitor, resistor, inductor, transformer, diodes.

Still yet many embodiments are directed to ceramic microelectronic devices without vias.

Yet still many embodiments connect ceramic microelectronic devices with an external circuit including (but not limited to): wire bonding, solder attachment, and die bonding.

Still yet many embodiments eliminate the via-fill process simplifying the manufacturing process and eliminating a number of steps from the manufacturing method.

One embodiment of the invention includes a microelectronic device comprising a dielectric body; at least a first conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion is in a second plane parallel to the first plane, where the second portion is either exposed to a top surface of the dielectric body or embedded within the dielectric body.

In a further embodiment, the microelectronic device further comprises at least a second conductive layer on the top surface of the dielectric body parallel to the first plane of the first conductive layer, such that a layer of dielectric material is disposed therebetween and defines a dielectric thickness.

In another embodiment, the microelectronic device further comprises at least a second conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to the top surface of the dielectric body in a second plane parallel to the first plane, where the first planes of the first conductive layer and second conductive layer are disposed parallel to each other within the dielectric body such that a layer of dielectric material is disposed therebetween and defines a dielectric thickness.

In a yet further embodiment, the microelectronic device further comprises at least an electronic component on the top surface of the dielectric body, connecting with the microelectronic device with the second portion of the first conductive layer and the second portion of the second conductive layer.

A still further embodiment also includes the microelectronic device further comprising at least a third conductive layer on the top surface of the dielectric body parallel to the first portion of the first conductive layer and the first portion of the second conductive layer, where the third conductive layer overlaps with the second portion of the first conductive layer such that a layer of dielectric material is disposed between the first portions of the first conductive layer and the second conductive layer and define a first dielectric thickness, and a layer of dielectric material is disposed between the first portion of the second conductive layer and the third conductive layer and define a second dielectric thickness.

In still another embodiment, the microelectronic device further comprises a conductive paste deposited at a left side and a right side of the microelectronic device, where the conductive paste overlaps partially with the top surface and a bottom surface of the dielectric body, where the bottom surface is opposite to the top surface.

In a yet further embodiment, the microelectronic device further comprises at least a third conductive layer embedded within the dielectric body and extending along a first plane within the dielectric body and parallel to the first portion of the first conductive layer; at least a fourth conductive layer embedded within the dielectric body and extending along a first plane within the dielectric body and parallel to the first portion of the first conductive layer, where the third and the fourth conductive layers are disposed parallel to each other within the dielectric body such that a layer of dielectric material is disposed therebetween and defines a dielectric thickness; and wherein the conductive layers are connected by the conductive paste.

In a further embodiment again, the microelectronic device further comprises at least a third conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to a bottom surface of the dielectric body in a second plane parallel to the first plane, where the bottom surface is opposite to the top surface; and at least a fourth conductive layer on the bottom surface of the dielectric body parallel to the first plane of the third conductive layer, such that a layer of dielectric material is disposed therebetween and defines a dielectric thickness.

In another embodiment again, the microelectronic device further comprises at least a third conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to a bottom surface of the dielectric body in a second plane parallel to the first plane, wherein the bottom surface is opposite to the top surface; at least a fourth conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to the bottom surface of the dielectric body in a second plane parallel to the first plane, where the first planes of the third conductive layer and fourth conductive layer are disposed parallel to each other within the dielectric body such that a layer of dielectric material is disposed therebetween and defines a dielectric thickness.

In a further additional embodiment, the microelectronic device further comprises at least a second conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to a bottom surface of the dielectric body in a second plane parallel to the first plane, and a third portion continuously interconnected with the first portion and embedded within the dielectric body and extending across at least a portion of the dielectric body along a third plane within the dielectric body such a portion of the dielectric material forming the dielectric body covers said the third portion, wherein the bottom surface is opposite to the top surface, where the first portion of the first conductive layer and the third portion of the second conductive layer are disposed parallel to each other within the dielectric body such that a layer of dielectric material is disposed between the first portion of the first conductive layer and third portion of the second conductive layer and defines a first dielectric thickness, and the first and third portions of the second conductive layer are disposed parallel to each other within the dielectric body such that a layer of dielectric material is disposed between the first and third portions of the second conductive layer and defines a second dielectric thickness.

In another additional embodiment, the microelectronic device further comprises at least a third portion of the first conductive layer continuously interconnected with the first portion and embedded within the dielectric body and extending across at least a portion of the dielectric body along a third plane within the dielectric body such a portion of the dielectric material forming the dielectric body covers said the third portion; at least a second conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to a bottom surface of the dielectric body in a second plane parallel to the first plane, and a third portion continuously interconnected with the first portion and embedded within the dielectric body and extending across at least a portion of the dielectric body along a third plane within the dielectric body such a portion of the dielectric material forming the dielectric body covers said the third portion, wherein the bottom surface is opposite to the top surface, where the first and third portions of the first conductive layer are disposed parallel to each other within the dielectric body such that a layer of dielectric material is disposed between the first and third portions of the first conductive layer and defines a first dielectric thickness, and the first and third portions of the second conductive layer are disposed parallel to each other within the dielectric body such that a layer of dielectric material is disposed between the first and third portions of the second conductive layer and defines a second dielectric thickness, and the third portions of the first conductive layer and the second conductive layer are disposed parallel to each other within the dielectric body such that a layer of dielectric material is disposed between the third portions of the first conductive layer and the second conductive layer and defines a third dielectric thickness.

In a still yet further embodiment, the microelectronic device further comprises at least a third portion of the first conductive layer continuously interconnected with the first portion, the third portion being exposed to the top surface of the dielectric body in the second plane.

In still yet another embodiment, the microelectronic device further comprises at least a second conductive layer on the top surface of the dielectric body, such that the second and third portions of the first conductive layer and the second conductive layer are on the same top surface, where an electronic component is deposited on the top surface of the dielectric body and connected with the third portion of the first conductive layer and the second conductive layer.

In a still further embodiment again, the electronic component is an inductor.

In still another embodiment again, the microelectronic device further comprises at least a second and a third conductive layer on the top surface of the dielectric body, such that the second and third portions of the first conductive layer and the second and third conductive layers are on the same top surface, where an electronic component is deposited on the top surface of the dielectric body and connected with the second and third conductive layers.

In a still further additional embodiment, the microelectronic device further comprises at least a third conductive layer on the top surface of the dielectric body, such that the second portions of the first and the second conductive layers and the third conductive layer are on the same top surface, where an electronic component is deposited on the top surface of the dielectric body and connected with the second portion of the first conductive layer and the third conductive layer.

In a still yet further embodiment, the second portions of the first and second conductive layers are independently wire-bonded to a portion of a circuit.

In yet another embodiment, at least the dielectric body is formed of a material selected from the group consisting of P100, NPO, X7R and Y5V dielectric materials.

Still another additional embodiment includes a method of manufacturing a microelectronic device: casting a sheet of a dielectric substrate having first and second surfaces; forming openings in the dielectric substrate; applying a plurality of conductive layers to the sheets of the dielectric substrate; aligning the sheets of the dielectric substrate such that at least a first conductive layer has at least a first portion embedded within the dielectric material and extending across at least a portion of the dielectric body along a first plane within the dielectric body such a portion of the dielectric material forming the dielectric body covers said first portion, and a second portion continuously interconnected with the first portion, the second portion is in a second plane parallel to the first plane, wherein the second portion is either exposed to a top surface of the dielectric body or embedded within the dielectric body; laminating the aligned sheets together; dicing the sheets into singulated devices; and sintering the devices.

In a yet further embodiment again includes firing may comprise one of either curing or firing.

Yet another embodiment again also includes firing is performed prior to dicing.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein.

DETAILED DISCLOSURE

Figure 1:
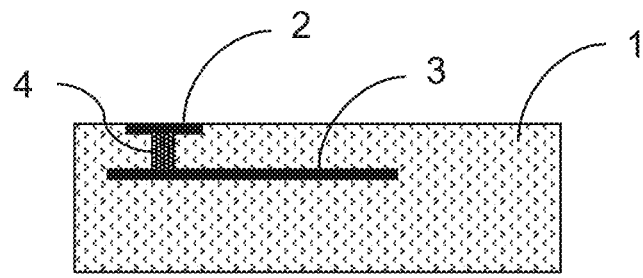
FIG. 1 provides a schematic of ceramic microelectronic devices with a via in accordance with the prior art.

The embodiments of the invention described herein are not intended to be exhaustive or to limit the invention to precise forms disclosed. Rather, the embodiments selected for description have been chosen to enable one skilled in the art to practice the invention.

Turning now to the drawings, microelectronics having form factors (e.g., dimensions and functionality) comparable with traditional microelectronics, but with considerably simplified design, and their methods of manufacture are provided. Many embodiments of the current invention provide microelectronics and methods that implement at least one continuous electrode between at least two layers of pre-fired ceramic sheets with dielectric properties. In some embodiments, at least one continuous electrode forms a conductive pad on a first plane and an embedded electrode on a second plane that is parallel to the first plane. The continuous electrode forms a bent structure connecting two parallel planes in accordance to several embodiments. Many embodiments of the current invention provide microelectronics and methods that implement microelectronics capable of being forming without the need for through-vias.

Many embodiments include more than one continuous electrode in various configurations to form a number of microelectronic devices. Continuous electrodes in such embodiments can form electronic components within the microelectronic devices. Examples of microelectronic devices formed with continuous electrodes according to embodiments include (but are not limited to): capacitors, resistors, inductors, transformers, diodes. Electronic components in such embodiments can be connected in series, in parallel, or any combination of. Exemplary ceramic dielectrics in these embodiments include, but are not limited to, high Q, temperature stable and high k dielectrics. Many embodiments of the current invention provide microelectronics and methods that implement the integration of multiple dielectric types in a single device producing high frequency performance characteristics. Exemplary dielectric materials in these embodiments include, but are not limited to, P100, NPO, X7R, Y5V. Many embodiments provide microelectronics and methods that implement at least one thin single layer capacitor interconnected to a Low Temperature Co-Fired Ceramic (LTCC) substrate. In a number of embodiments, capacitors and methods described below allow for devices to be produced with much higher capacitance.

In many embodiments, continuous electrodes in ceramic microelectronic devices can be assembled from a number of ceramic sheets. Some ceramic sheets used to make ceramic microelectronic devices in accordance with some embodiments do not have metalization or openings. Some ceramic sheets in several embodiments are cast, blanked, punched open, and metalized with a metal conductor on the surface. In some embodiments, ceramic sheets can be ceramic materials that have not been fired. Examples of ceramic sheets include (but are not limited to): Ferro A6M. In several embodiments, conductor pastes that are compatible to the dielectric material can be used for metalization process. Examples of compatible conductor to Ferro A6M include (but are not limited to): Ferro CN30-080M gold paste. In a number of embodiments, ceramic sheets, with and without metalization, are aligned and laminated. In many embodiments sufficient lamination pressure can be applied to form a device with flat top and bottom surfaces. In some embodiments, lamination is under isostatic pressure. In several embodiments, sintering can include firing process but may also include curing. The metal conductor is slightly deformed due to the plastic nature of the ceramic sheet. This allows a continuous electrode to connect the outside of the device to an internal layer within the ceramic component obviating the need for a via in accordance with various embodiments. In some embodiments the continuous electrode may connect two layers within the device obviating the need for a buried via.

In several embodiments, the dielectric sheets and metal electrodes can be fabricated with screen printing and/or digital printing techniques. Some embodiments describe that the dielectric substrates can be screen printed. A number of embodiments include screen printing the metal electrodes. In some embodiments, 3D printing processes can be used to fabricate the dielectric substrates and electrodes.

Various embodiments include continuous electrodes that can bend at different angles, which makes it possible to fabricate more complex electronic components within the microelectronic devices. In some embodiments, a conductive material can be applied to the side of microelectronic devices to allow other internal electronic components or electrodes to connect with the bent electrodes. The side termination may allow more flexibility in mounting the device to an external circuit in embodiments. In many embodiments continuous electrodes can be formed on both sides of ceramic microelectronic devices. Being able to make bent electrodes on both sides of the device can negate the need to orient the device and provide redundant circuitry and/or add an additional electronic component to the same device. Some embodiments implement continuous electrodes with multiple bends that can penetrate deeper into the dielectric device. In various embodiments, continuous electrodes are able to bend inside ceramic body and back to the surface to create a tunnel bypassing a component on the surface of the microelectronic device. The component can be a spiral inductor in certain embodiments.

Many embodiments of the current invention provide microelectronics and methods capable of combination with any other passive electronic component such as a resistor or inductor further improving functionality and reducing space requirements on the circuit. Several embodiments provide microelectronics and methods configured to be mounted to a short block or other device without the use of a through-via, simplifying connection to a circuit. In several embodiments, ceramic microelectronic devices with continuous electrodes can be connected with at least one external component. The external component can be any electronic circuit component. Examples of external components include (but are not limited to): capacitors, resistors, inductors, transformers, diodes, transistors, conductors, and ground-planes. In several embodiments, microelectronic devices can be wire bonded, solder attached and/or die bonded to connect to outside circuits. The continuous electrodes may eliminate the risk of electrical failure due to poor connection of via to electrode. Elimination of the via can reduce the complexity and cost of manufacturing ceramic microelectronic devices in accordance to various embodiments.

These and other embodiments and methods described below allow for ceramic microelectronic devices to be made smaller, ultimately saving space on the circuit and allowing miniaturization or the ability to add redundant circuits in the same space for high reliability applications.

Microelectronic Devices

Co-fired ceramic devices are fabricated using a multilayer approach. The starting material is composite green tapes, consisting of ceramic particles mixed with polymer binders. Green tapes refer to ceramic materials that have not been fired. The tapes are flexible and can be machined, for example using cutting, milling, punching and embossing. Metal structures can be added to the layers, commonly using via filling and screen printing. Individual tapes are then bonded together in a lamination procedure before the devices are fired in a kiln, where the polymer part of the tape is combusted and the ceramic particles sinter together, forming a hard and dense ceramic component.

Co-firing can be divided into low temperature (LTCC) and high temperature (HTCC) applications: low temperature means that the sintering temperature can be below 1000° C. (1830° F.), while high temperature is around 1600° C. (2910° F.). The lower sintering temperature for LTCC materials is made possible through the addition of a glassy phase to the ceramic, which lowers its melting temperature.

Due to a multilayer approach based on glass-ceramics sheets this technology offers the possibility to integrate into the LTCC body passive electrical components and conductor lines typically manufactured in thick film technology. This differs from semiconductor device fabrication where layers are processed serially and each new layer is fabricated on top of previous layers.

Blind and buried vias are used to connect between layers of a ceramic multi-layer circuit where space is at a premium. A Blind Via connects an outer layer to one or more inner layers but does not go through the entire board. A Buried Via connects two or more inner layers but does not go through to an outer layer.

Many ceramic microelectronic devices are fabricated using a multi-layer approach. This includes devices such as conductors, capacitors, inductors, resistors, transformers and hybrid circuits as well as packaging of devices for medical, military, MEMS, microprocessor, microwave and RF applications. Many of these devices can be fabricated as stand-alone components or combined to form a monolithic circuit. Conventionally such the devices are built-up in layers using ceramic sheets with specific dielectric properties. The individual sheets are patterned using pastes of varying conductive properties. The sheets are stacked together, the different layers of conductive pastes connected using vias to form an electrical circuit or device. Exemplary process steps for creating such a device may include the following:

Ceramic sheet blanking
Via punching
Via forming
   Via fill
   Compress via
   Dry filled via tape
Conductor printing
Layer alignment and lamination
Sintering
Dicing into individual device/circuit Forming and filling of via holes requires a number of steps in itself. There are also a number of potential issues associated with the use of via in these devices including poor connection to buried conductive layers, which can lead to device failure and variations in surface topography associated with the shrinking of the vial fill material. Variations in surface topography may affect the ability to connect the device to an external circuit using wire bond, solder, or other attach techniques. Variations in surface topography may also affect the integrity of additional thin-film layers or thick-film layers such as conductors or resistors.

An example of a simple ceramic capacitor manufactured using via technology is shown schematically in FIG. 1. An external pad (2) is connected to a conductor or other component (3) contained within a ceramic body (1) using a via (4). This type of component would typically be built up in layers with internal conductor (3) and external pad (2) being screen printed on ceramic tape. Further sheets of ceramic tape are punched with a via hole. The via hole is then filled (4) using a stencil print process. The sheets are aligned, tacked together, laminated and fired to produce a monolithic ceramic component. This system requires multiple screens and printing processes to produce a simple electrical connection between horizontal layers in a microelectronic ceramic component. The ability to fully fill the via during stencil print and shrinkage of the via material during sintering processes can lead to voids within the via itself and possible connection issues between via (4) and the external pad (2) and internal conductor (3). These can lead to reliability issues and performance issues with the device often exacerbated under higher voltages and frequencies. These types of devices are often wire-bonded to an external circuit which requires a flat surface to make a reliable connection. The shrinking vias often leave "craters" on the top surface of conductive pad (2) which can make wire-bonding difficult.

Figure 2:
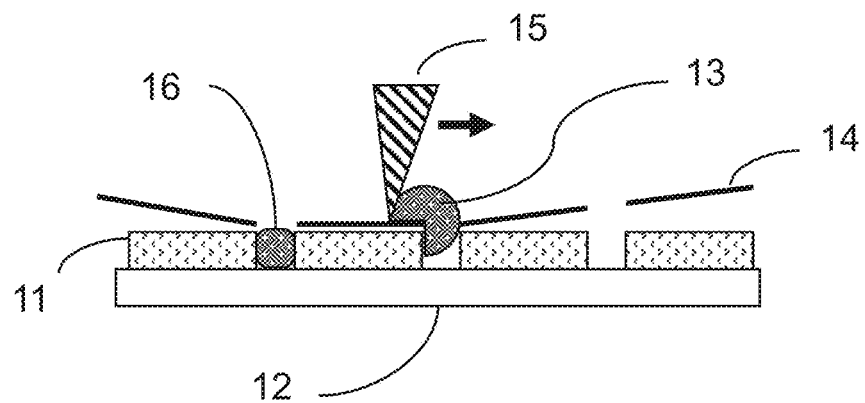
FIG. 2 provides a schematic of stencil printing traditional vias in ceramic microelectronic devices in accordance with the prior art.

An example of a stencil printing process to make vias in a microelectronic device is shown schematically in FIG. 2. A green ceramic sheet containing punched via holes (11) is placed on a substrate (12). Substrate (12) is often constructed of porous material and vacuum applied to the substrate to both secure ceramic sheet (11) and aid in filling of vias. A metal stencil (14) with openings corresponding to the via holes in the ceramic tape (11) is carefully aligned with the ceramic sheet. A conductive paste (13) is pushed across the stencil by a squeegee (15) leaving a filled via (16) behind. There are a number of technical difficulties with this process that require careful attention. Often via holes are left with incomplete filling or are over filled with paste and require a flattening step. It is also difficult to correctly fill vias on extremely thin ceramic sheets as these must be backed by a PET film for stability. Removal of this film at the stacking stage can remove the via fill material or leave material proud of the via hole.

Embodiments of Microelectronic Devices

Apparatus in accordance with various embodiments of the invention rely upon continuous electrodes that can connect the outside of microelectronic devices to at least an internal layer within the ceramic body of the device. As is discussed further below, any of a variety of electrode structure can be utilized as appropriate to the requirements of specific applications in accordance with various embodiments of the invention.

Many embodiments are directed to microelectronics devices where the via is replaced by a novel electrode structure. In various embodiments, microelectronics have at least one continuous electrode between at least two layers of pre-fired ceramic dielectrics. The at least one continuous electrode can form a conductive pad on a first plane and an embedded electrode on a second plane that is parallel to the first plane in accordance to several embodiments. The continuous electrode can form a bent structure connecting two parallel planes, forging a connection with the outside of the device to an internal layer within the ceramic component obviating the need for a via in accordance with various embodiments. In some embodiments the continuous electrode may connect two layers within the device obviating the need for a buried via. In several embodiments, the continuous electrodes can replace blind vias and/or buried vias.

Figure 3:
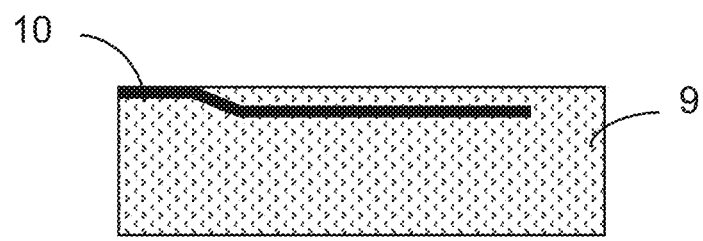
FIG. 3 provides a schematic diagram of a ceramic microelectronic device in accordance with certain embodiments.

A microelectronic device with a bent electrode in accordance with an embodiment of the invention is shown in FIG. 3. The devices comprise a single continuous electrode (10) that has a parallel portion within a dielectric body (9). The metal conductor (10) is slightly bent to allow a continuous electrode to pass from the outside of the device to an internal layer within the ceramic dielectric component without the use of a via. The device can be sintered to produce a monolithic component. The conductive surface of the metal conductor 10 can be directly bonded to an external circuit.

While structures for continuous and bent electrodes in microelectronic devices are described above with reference to FIG. 3, any variety of structures that implement continuous electrodes that are bent to connect different layers can be utilized in the design and fabrication of microelectronic devices as appropriate to the requirements of specific applications in accordance with various embodiments of the invention. Processes for manufacturing microelectronic devices in accordance with various embodiments of the invention are discussed further below.

Methods of Manufacturing Microelectronic Devices

Methods and processes in accordance with various embodiments of the invention rely upon manufacturing microelectronic devices to have at least one continuous electrode. As is discussed further below, any of a variety of manufacturing process can be utilized as appropriate to the requirements of specific applications in accordance with various embodiments of the invention.

Figure 4:
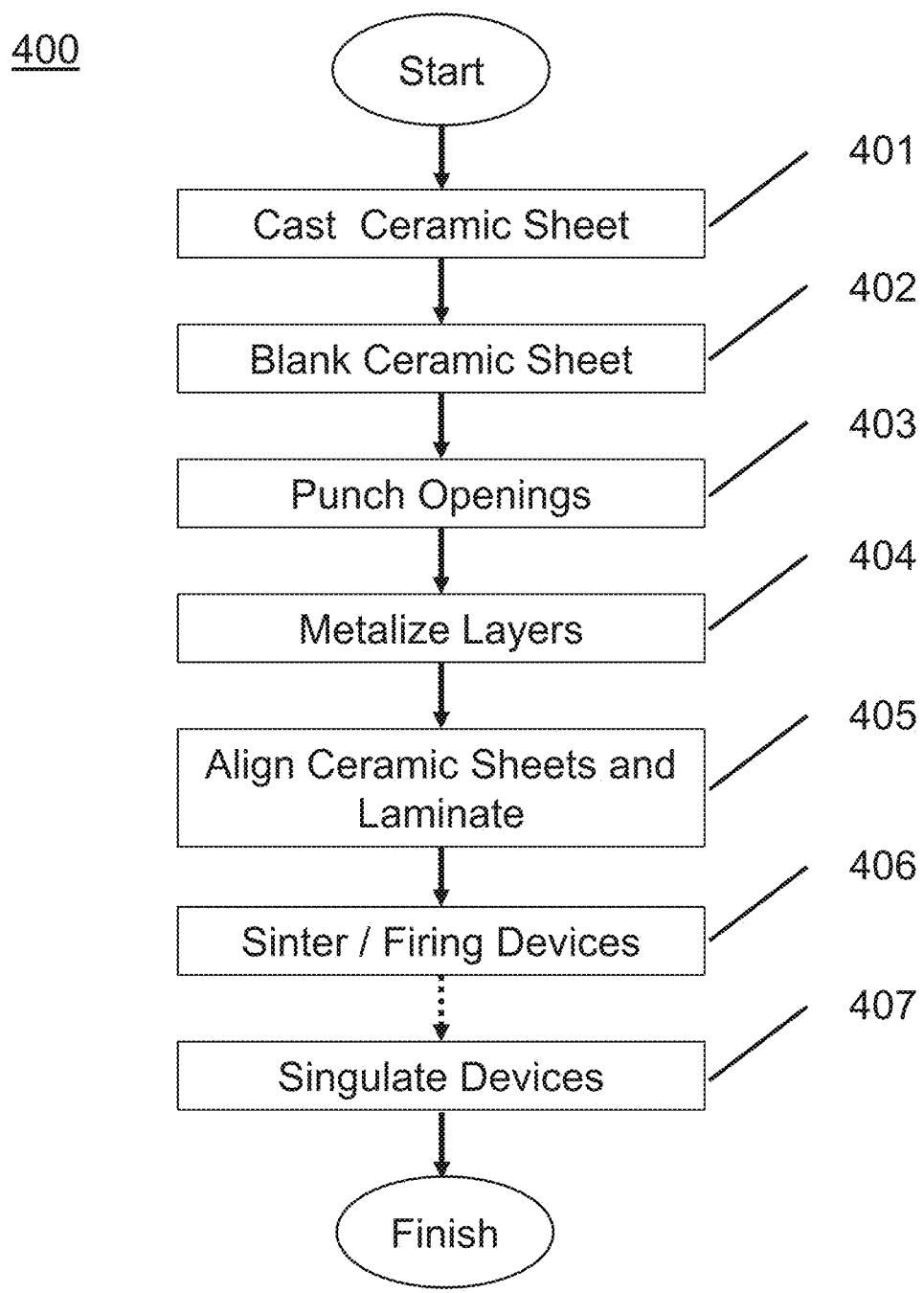
FIG. 4 provides a flow-chart of a method of manufacturing ceramic microelectronic devices in accordance with certain embodiments.
Figure 5:
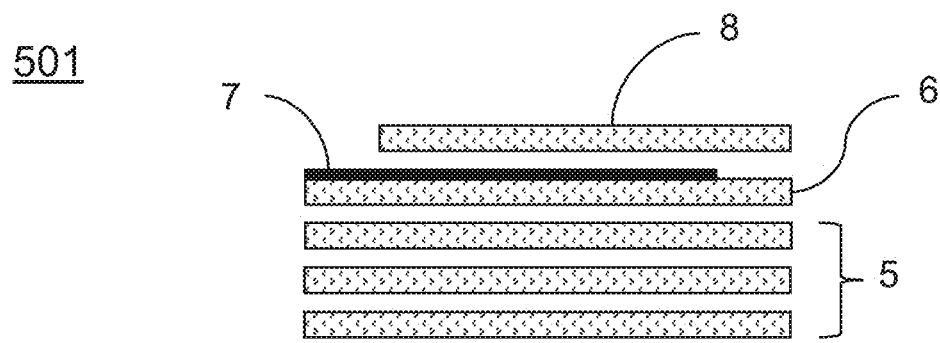
FIG. 5 provides a schematic of a method of manufacturing ceramic microelectronic devices in accordance with certain embodiments.
Figure 5:
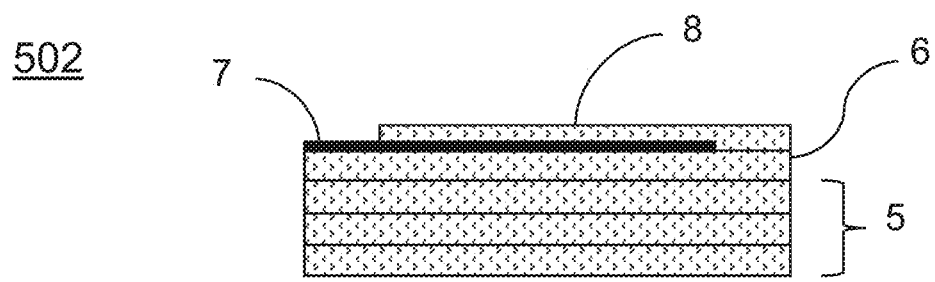
Figure 5:
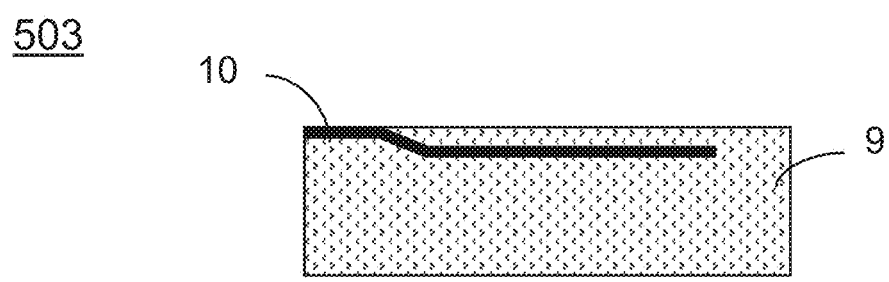

A method for manufacturing microelectronic devices with continuous electrodes in accordance with an embodiment of the invention is illustrated in FIG. 4. The process 400 can begin casting ceramic sheets (401). Many embodiments are directed to embodiments that incorporate pre-fired dielectric substrates. In some embodiments, ceramic sheets have dielectric properties. Exemplary ceramic dielectrics properties in these embodiments include, but are not limited to, high Q, temperature stable and high k dielectrics. Exemplary dielectrics in these embodiments include, but are not limited to, P100, NPO, X7R, Y5V. In several embodiments, ceramic sheets can be green tapes which refer to ceramic materials that have not been fired. Examples of ceramic sheets include but are not limited to Ferro A6M. Many embodiments provide microelectronics and methods that implement the integration of multiple dielectric types in a single device producing high frequency performance characteristics. The ceramic sheets are then blanked (402). Openings are punched in some of the blanked ceramic sheets (403). Ceramic sheets are metalized with a conductor material (404). In several embodiments, conductor pastes that are compatible to the dielectric material can be used for metalization process. Examples of compatible conductor to Ferro A6M include (but are not limited to): Ferro CN30-080M gold paste. Some ceramic sheets are not metalized (not shown). Metalized and nonmetallized ceramic sheets are then aligned and laminated (405). Careful location and design of the openings and positioning of the metalized patterns allows continuous conductors to be distorted from one layer to one or more adjacent layers. In some embodiments the lamination pressure is sufficient to form a device with a flat top surface. In some embodiments, lamination is performed under isostatic pressure. Laminated ceramic sheets are sintered to form monolithic microelectronic devices (406). In several embodiments, sintering can include firing process. In many embodiments, once these layers are deposited and formed, they may then be cured/fired, lapped as necessary to create the appropriate thickness and then topped by the required conductive layers to form the device. The sheet may then be diced (407) as necessary to form the individual devices, for example electronic components and/or circuits. A method for manufacturing microelectronic devices with a continuous electrode assembled from ceramic sheets in accordance with an embodiment of the invention is illustrated in FIG. 5.

Process 501 illustrates a number of layers of green ceramic sheets: base layers of green ceramic sheets (5) are without metalization or openings, a layer of green ceramic sheet (6) with a metal conductor (7) printed on top, and a top layer of green ceramic sheet with openings punched in (8) and no metal print. Process 502 shows the green ceramic sheets from process 301 are carefully aligned and tacked to each other.

Process 503 illustrates that the stack of ceramic sheets from process 502 is subjected to isostatic pressure to form a device with a flat top surface. The metal conductor (10) is slightly deformed due to the plastic nature of the ceramic sheet. This allows a continuous electrode to pass from the outside of the device to an internal layer within the ceramic component. The device can now be sintered to produce a monolithic component. In such embodiments, the green ceramic sheets may be formulated by dispersing ceramic powder into a polymer binder system. The stack of ceramic loaded sheets may undergo plastic deformation when subjected to lamination conditions. Careful location and design of the openings and positioning of the metalized patterns allows continuous conductors to be distorted from one layer to one or more adjacent layers in accordance to certain embodiments.

Figure 6:
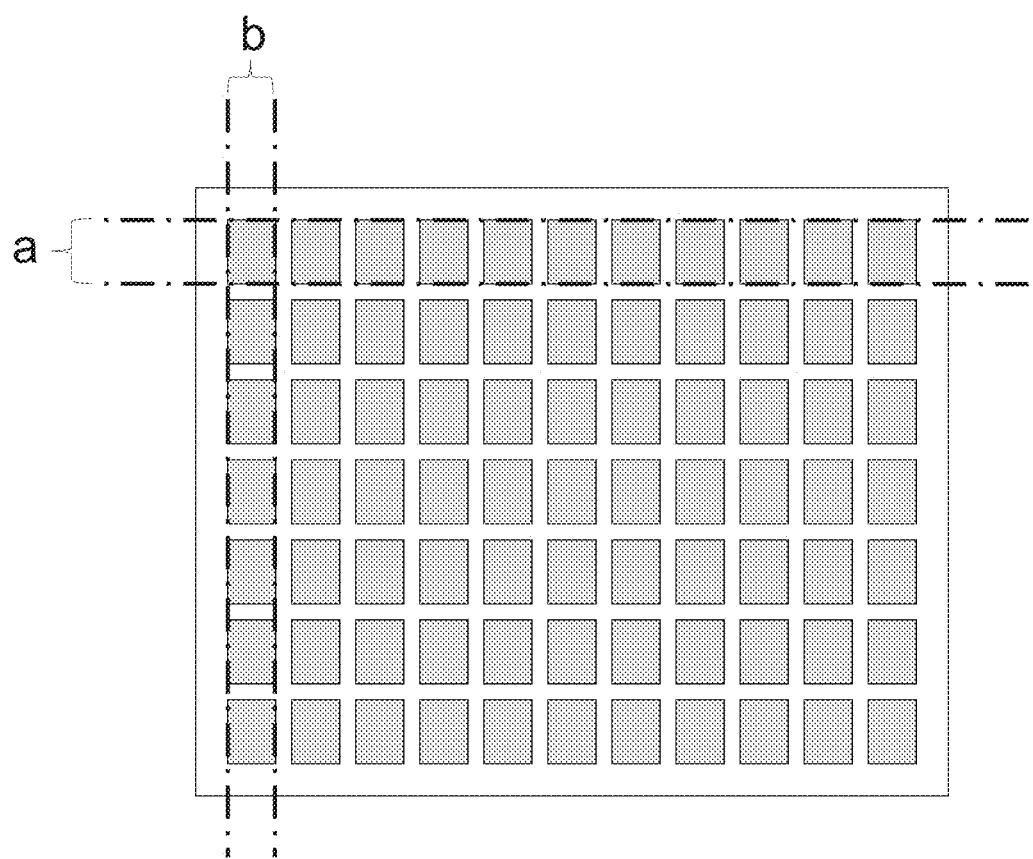
FIG. 6 provides a schematic of dicing ceramic microelectronic devices in accordance with certain embodiments.

In certain embodiments, multiple microelectronic devices can be manufactured on the same substrates. Once the ceramic sheets are deposited and formed, they may then be cured/fired, lapped as necessary to create the appropriate thickness and then topped by the required conductive layers to form the device. FIG. 6 illustrates multiple devices on the same substrate in accordance with an embodiment. The sheet may be diced (a/b) as necessary to form the individual devices.

While methods for manufacturing continuous and bent electrodes in microelectronic devices are described above with reference to FIGS. 4-6, any variety of processes that fabricate continuous electrodes that are bent to connect different layers can be utilized in the design and fabrication of microelectronic devices as appropriate to the requirements of specific applications in accordance with various embodiments of the invention.

Embodiments Implementing Microelectronic Devices

Apparatus in accordance with many embodiments of the invention rely upon continuous electrodes inside microelectronic devices that can form various electronic components. Although some device architectures are provided and discussed below, it will be understood that using the electrode structures according to embodiments in other devices may be contemplated. As is discussed further below, any of a variety of microelectronic devices can be utilized as appropriate to the requirements of specific applications in accordance with various embodiments of the invention.

Many embodiments include that more than one continuous electrode can be formed in a microelectronic device. Continuous electrodes in such embodiments can form electronic components within the microelectronic devices. Examples of microelectronic devices formed with continuous electrode include (but are not limited to): capacitor, resistor, inductor, transformer, diode, conductors, groundplanes. Electronic components in such embodiments can be connected in series, in parallel, or any combination of.

Figure 7:
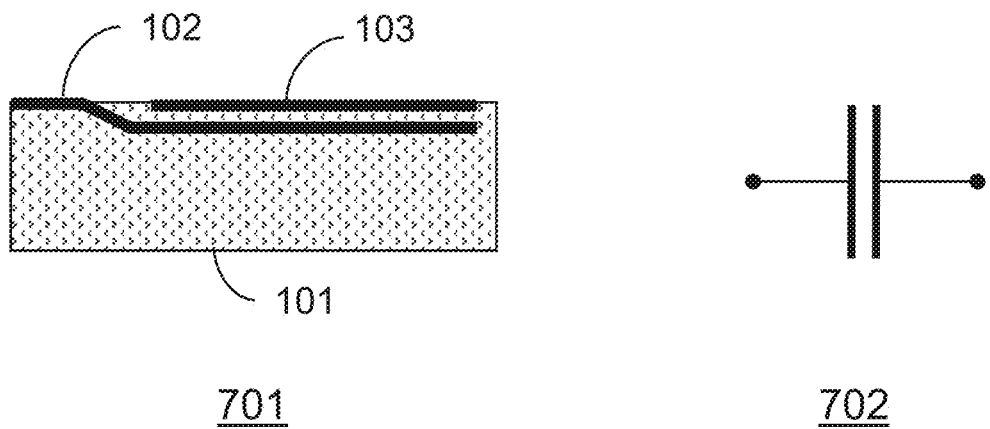
FIG. 7 provides schematics diagram of a capacitor with one bent electrode formed in ceramic microelectronic devices in accordance with certain embodiments.

A microelectronic device with a bent electrode forming a capacitor in accordance with an embodiment of the invention is shown in FIG. 7. In some such embodiments, a ceramic body (101) contains a continuous electrode (102) forming both a conductive pad on the external top surface or first plane of the device and an embedded electrode in a second plane within the device parallel to the first plane as shown in 701 is provided. An additional electrode (103) is printed on the top surface of the device and acts as an external pad and an electrode to create a simple capacitor. 702 represents a simplified circuit diagram of a capacitor as illustrated in 701.

Figure 8:
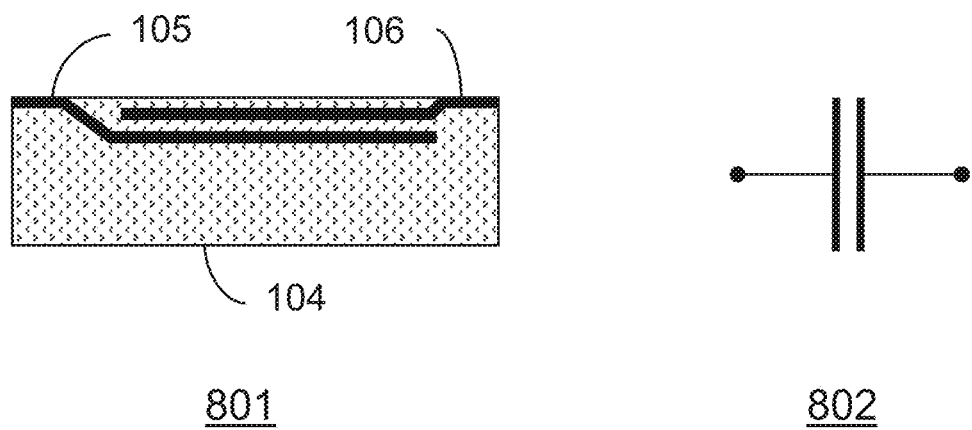
FIG. 8 provides schematics diagram of a capacitor with two bent electrodes formed in ceramic microelectronic devices in accordance with certain embodiments.

A microelectronic device with two bent electrodes forming a capacitor inside in accordance with an embodiment of the invention is shown in FIG. 8. In some such embodiments, a ceramic body (104) contains two continuous electrodes (105, 106) as shown in 801 is provided. Each continuous electrode has a conductive pad on the external top surface or first plane of the device and an embedded electrode in a second plane within the device parallel to the first plane. The parallel continuous electrodes 105 and 106 form a capacitor embedded within the device (104). Additional bent electrodes may be added to make more complex assemblies or arrays. 802 represents a simplified circuit diagram of a capacitor as illustrated in 801.

Many embodiments of the current invention provide microelectronics and methods capable of combination with any other passive electronic component such as a resistor or inductor further improving functionality and reducing space requirements on the circuit. Several embodiments provide microelectronics and methods configured to be mounted to a short block or other device without the use of a through-via, simplifying connection to a circuit. In several embodiments, ceramic microelectronic devices with continuous electrodes can be connected with at least one external component. The external component can be any electronic circuit component. Examples of external components include (but are not limited to): capacitors, resistors, inductors, transformers, diodes, transistors, conductors, groundplanes.

Figure 9:
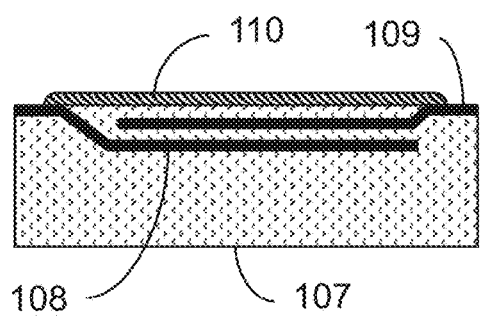
FIG. 9 provides schematics diagram of a capacitor with an additional electrical component formed in ceramic microelectronic devices in accordance with certain embodiments.
Figure 9:
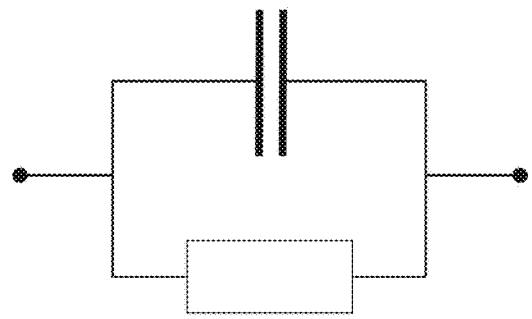

A microelectronic device with two bent electrodes forming a capacitor inside and with an additional external component in accordance with an embodiment of the invention is shown in FIG. 9. In some such embodiments, a ceramic body (107) contains two continuous electrodes (108, 109) as shown in 901 is provided. Each continuous electrode has a conductive pad on the external top surface or first plane of the device and an embedded electrode in a second plane within the device parallel to the first plane. The parallel continuous electrodes 108 and 109 form a capacitor embedded within the device. An additional external component can be applied to the surface (110) in connection with one or more of the electrodes. The external component could be a resistor or other electrical component. 902 represents a simplified circuit diagram of a capacitor connecting to an electrical component as illustrated in 901.

Figure 10:
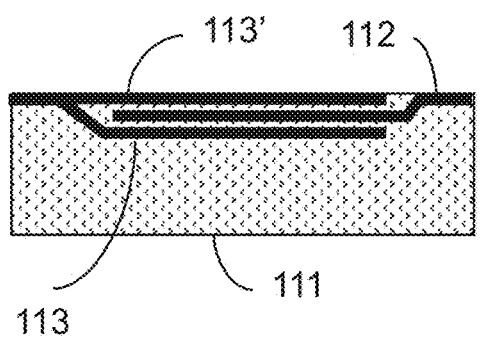
FIG. 10 provides schematics diagram of a more complex capacitor with bent electrodes formed in ceramic microelectronic devices in accordance with certain embodiments.
Figure 10:
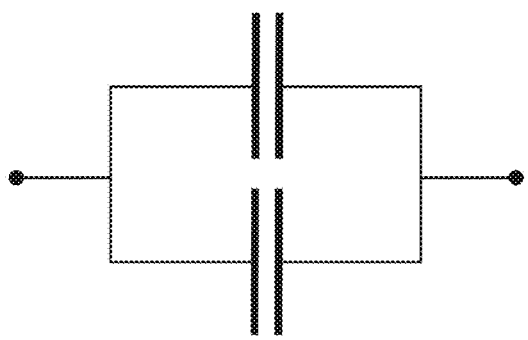

Many embodiments include at least one continuous electrode having an additional print electrode on the surface of the microelectronic device. A microelectronic device with two bent electrodes and an additional print electrode forming a capacitor in accordance with an embodiment of the invention is shown in FIG. 10. In some such embodiments a ceramic body (111) contains two continuous electrodes (112, 113) as shown in 1001 is provided. Each continuous electrode has a conductive pad on the external top surface or first plane of the device and an embedded electrode in a second plane within the device parallel to the first plane. The parallel continuous electrodes (112) and (113) are embedded within the device. One of the continuous electrodes (113) has an additional print electrode (113') after stacking the top layer creating a forked electrode. The forked electrode (113) and (113') could interact with a second continuous electrode (112) to create a more complexed capacitor. 1002 represents a simplified circuit diagram of a capacitor network as illustrated in 1001.

In some embodiments, a conductive material can be applied to the side of microelectronic devices as to terminate the conductive pathway and allow other internal electronic components or electrodes to connect with the bent electrodes. The side termination may allow more flexibility in mounting the device to an external circuit in another embodiments.

In many embodiments, a single layer capacitor using the bent electrode may be provided in combination with a multi-layer capacitor. Devices of such construction may find particular use in high frequency or broadband circuits in accordance with certain embodiments. Several embodiments are configured to provide inductances (at least for the lower capacitor portion) to be as low as possible. Using via connects in a device inherently add some inductance hence removing the via in accordance with embodiments is particularly advantageous in high frequency applications. Moreover, in some embodiments, by positioning a bent electrode capacitor at the bottom of the device can eliminate the need for wire bonds (again reducing inductance). There is also a performance advantage in having a capacitor positioned as close to the ground plane of the circuit as possible in accordance with such embodiments.

Figure 11:
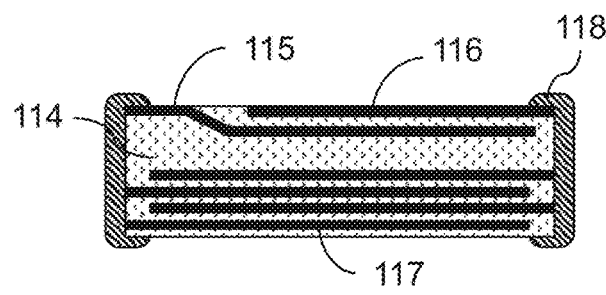
FIG. 11 provides schematics diagram of a ceramic microelectronic device with end termination incorporating a single capacitor and a multilayer capacitor in accordance with certain embodiments.
Figure 11:
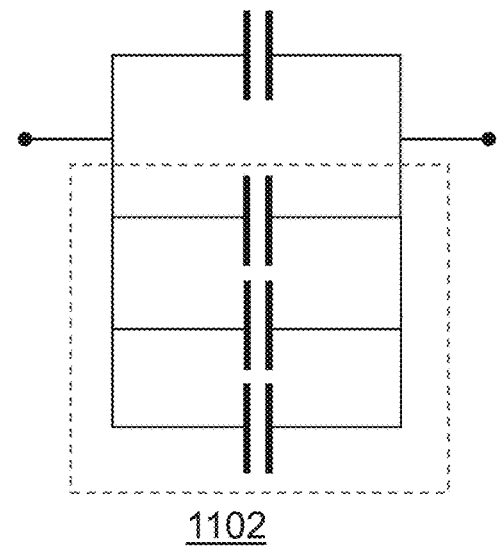

A microelectronic device with a single layer capacitor and a multi-layer capacitor inside a ceramic body with side termination in accordance with an embodiment of the invention is shown in FIG. 11. In some such embodiments, a ceramic body (114) contains a continuous electrode (115) forming both a conductive pad on the external top surface or first plane of the device and an embedded electrode in a second plane within the device parallel to the first plane as shown in 1101 is provided. An electrode (116) is printed on the top surface of the device and acts as an external pad and an electrode to create a simple capacitor. An external conductive 'termination' (118) can be applied to the device to allow other internal components or electrodes to connect with the bent electrode. In this case a multi-layer capacitor (117) can be combined in parallel with a simple single-layer capacitor. These terminations can also allow more flexibility in mounting the device to an external circuit using solder attach. 1102 represents a simplified circuit diagram of two capacitors in parallel as illustrated in 1101.

In many embodiments continuous electrodes can be disposed on both sides of ceramic microelectronic devices. Being able to make bent electrodes on both sides of the device can negate the need to orient the device and provide redundant circuitry and/or add an additional electronic component to the same device.

Figure 12:
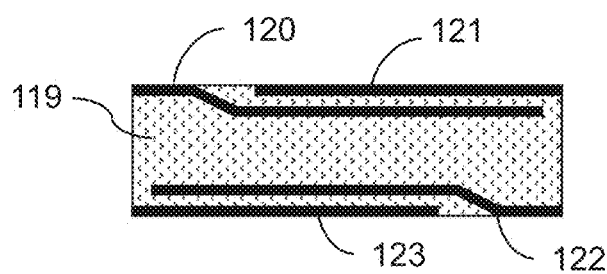
FIG. 12 provides schematics diagram of ceramic microelectronic devices with the top surface and the bottom surface containing bent electrodes in accordance with certain embodiments.
Figure 12:
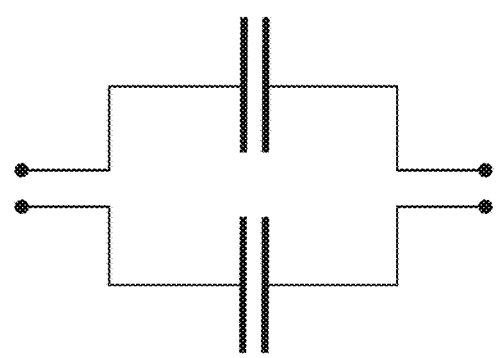

A microelectronic device where both the top surface and bottom surface contain components formed using the bent electrodes in accordance with an embodiment of the invention is shown in FIG. 12. In many such embodiments, a ceramic body (119) contains a continuous electrode (120) on the top surface forming both a conductive pad on the external top surface or first plane of the device and an embedded electrode in a second plane within the device parallel to the first plane as shown in 1201 is provided. An electrode (121) is printed on the top surface of the device and acts as an external pad and an electrode to create a simple capacitor. A continuous electrode (122) on the bottom surface forming both a conductive pad on the external top surface or third plane of the device and an embedded electrode in a fourth plane within the device parallel to the third plane. An electrode (123) is printed on the bottom surface of the device and acts as an external pad and an electrode to create a capacitor. 1202 represents a simplified circuit diagram of two capacitors with separate electrical connections as illustrated in 1201.

Figure 13:
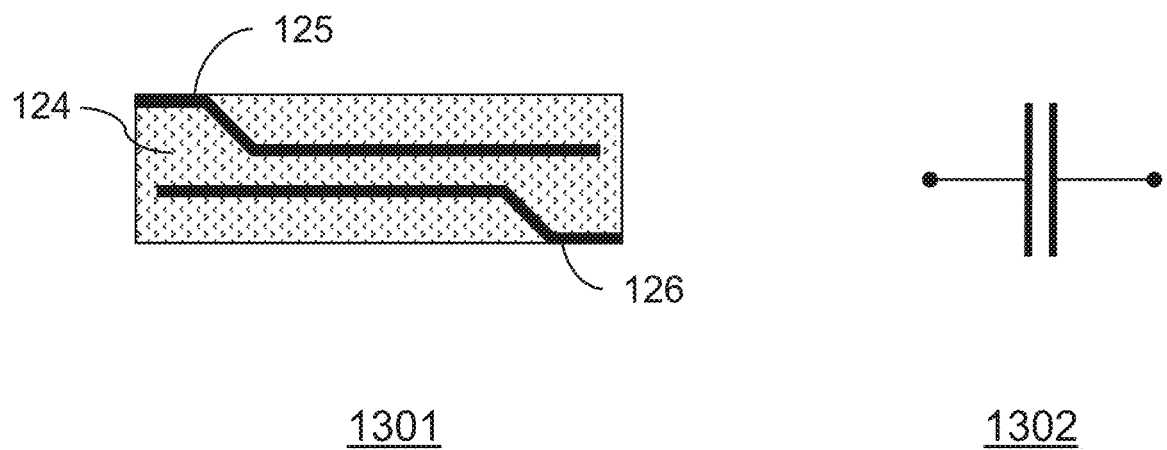
FIG. 13 provides schematics diagram of a capacitor with bent electrodes on opposing faces of ceramic microelectronic devices in accordance with certain embodiments.

Various embodiments are configured such that the continuous electrodes can start on opposing surfaces of the device, which makes it possible to fabricate variable electronic components structures within the microelectronic devices. A microelectronic device with two bent electrodes on opposing surfaces forming a capacitor in accordance with an embodiment of the invention is shown in FIG. 13. In some such embodiments, a ceramic body (124) contains two continuous electrodes (125, 126) as shown in 1301 is provided. One continuous electrode (125) has a conductive pad on the external top surface or first plane of the device and an embedded electrode in a second plane within the device parallel to the first plane. One continuous electrode (126) has a conductive pad on the external bottom surface or third plane of the device and an embedded electrode in a fourth plane within the device parallel to the third plane. The parallel continuous electrodes (125) and (126) form a capacitor embedded within the ceramic body (124). 1302 represents a simplified circuit diagram of a capacitor as illustrated in 1301.

Figure 14:
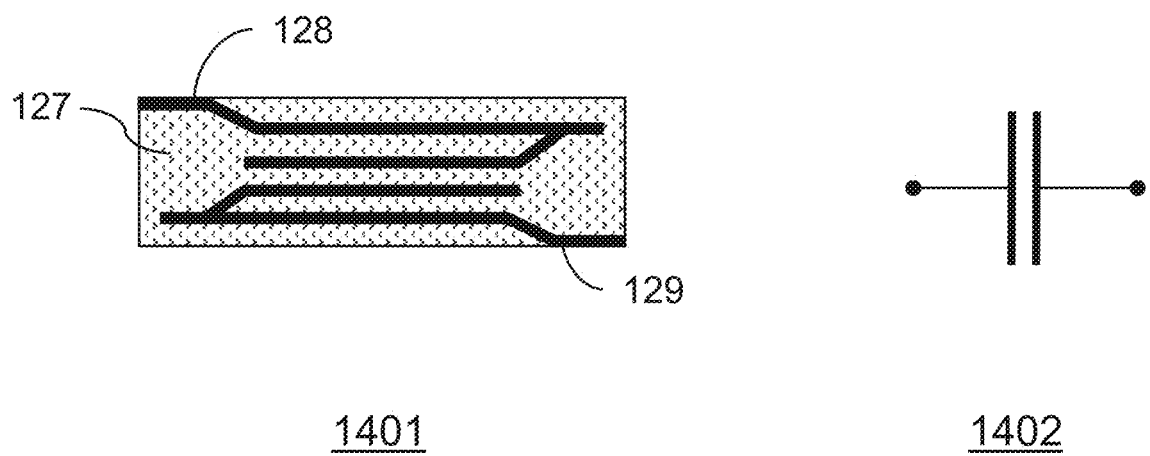
FIG. 14 provides schematics diagram of a capacitor with bent electrodes with multiple bends on opposing faces of ceramic microelectronic devices in accordance with certain embodiments.

Some embodiments implement continuous electrodes with multiple bends that can penetrate deeper into the dielectric device. A microelectronic device with multiple bent electrodes on opposing surfaces forming a capacitor in accordance with an embodiment of the invention is shown in FIG. 14. In some such embodiments, a ceramic body (127) contains two continuous electrodes (128, 129) with multiple bends as shown in 1401 is provided. One continuous electrode (128) has a conductive pad on the external top surface or first plane of the device, an embedded electrode in a second plane within the device parallel to the first plane, and an embedded electrode in a third plane within the device parallel to the first and second plane. One continuous electrode (129) has a conductive pad on the external bottom surface or fourth plane of the device, an embedded electrode in a fifth plane within the device parallel to the fourth plane, and an embedded electrode in a sixth plane within the device parallel to the fourth and fifth plane. The parallel continuous electrodes (128) and (129) form a capacitor penetrating deeper and further within the ceramic body (127). 1402 represents a circuit diagram of a capacitor as illustrated in 1401.

Due to the relatively flat surface topography, additional components can be easily added to the surface of the microelectronic devices in accordance to several embodiments. In some embodiments, a thick film resistor could be printed on the surface of the device between the two exposed parts of the conductor to create a RC circuit. In various embodiments, thick film and/or thin film components could be added to microelectronic devices to create more complex hybrid circuits. Some additional components may have more challenging connection requirements. These additional components could be buried inside the device or on the surface in accordance with some embodiments. Many embodiments include that by positioning the conductors and openings in different locations and on different layers within the device, fairly complex circuits can be obtained. Multiple inductors, resistors, capacitors, transformers, conductors, groundplanes can be in series, parallel or series/parallel configuration in a number of embodiments.

Figure 15:
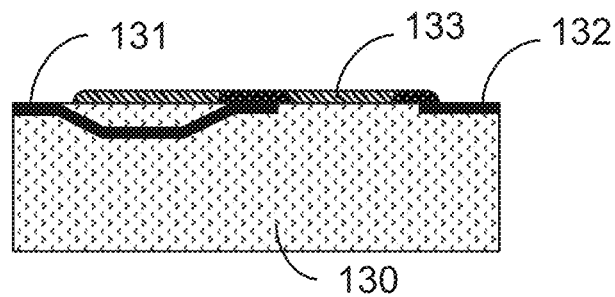
FIG. 15 provides a schematic diagram of a ceramic microelectronic device with an electrode that bends inside the ceramic body and back again to the top surface creating a tunnel bypassing a component on the top surface of the device in accordance with certain embodiments.
Figure 16:
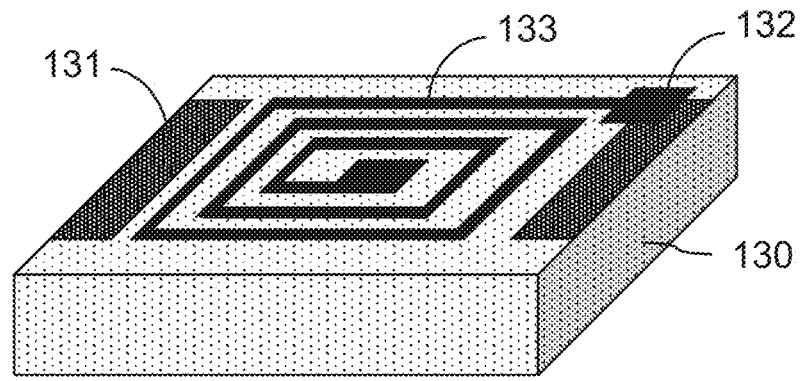
FIG. 16 provides a schematic diagram of a ceramic microelectronic device incorporating an inductor in accordance with certain embodiments.

In various embodiments, continuous electrodes are able to bend inside ceramic body and back to the surface and create a tunnel connecting a component on the surface of the microelectronic device. The component can be a spiral inductor in certain embodiments. The inductor can be printed on the top surface and/or internally within the ceramic body in some embodiments. A microelectronic device with bent electrodes producing a chip inductor in accordance with an embodiment of the invention is shown in FIG. 15. In some such embodiments, a device with an electrode (131) that bends inside the ceramic body (130) and back again to the top surface creating a tunnel bypassing a component (133) on the top surface of the device is provided. In this case the component could be a spiral inductor with the outside of the spiral conductor being connected to a pad (132) at one edge of the device and the center of the inductor being connected to a pad at the other edge of the device by the continuous electrode containing the double bend (131). FIG. 16 illustrates another view of the device described in FIG. 15 showing the top surface of the device, spiral inductor (113) and right-side pad (132) and the left side pad created by the bent conductor (131).

Figure 17:
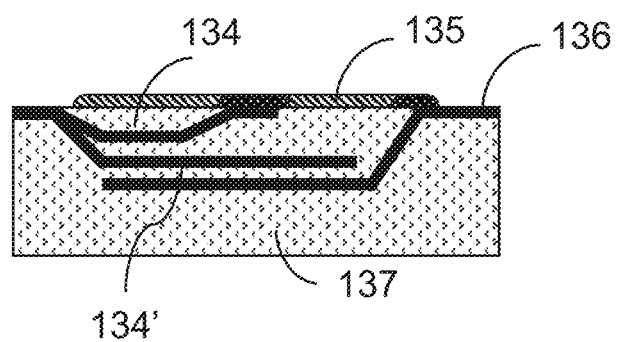
FIG. 17 provides a schematic diagram of a ceramic microelectronic device incorporating an inductor and a capacitor in accordance with certain embodiments.

A microelectronic device forming a capacitor with continuous electrodes connecting an electronic component in accordance with an embodiment of the invention is shown in FIG. 17. In some such embodiments, a device with an electrode (134) that bends inside the ceramic body (137) and back again to the top surface creating a tunnel bypassing a component (135) on the top surface of the device is provided. The continuous electrode (134) has an additional bent electrode (134') parallel to the top surface creating a forked electrode. A second continuous electrode (136) is embedded inside the ceramic body (137) and is parallel to the forked electrode (134'). The forked electrode (134') could react with a second continuous electrode (136) to create a capacitor. In some cases, component (135) can be a surface printed inductor that has a coil shape with one termination at the outside edge of the pattern and one at the center of the coil. This can be accommodated by adding an additional conductor 134 within the device, exposed at a suitable location for connection to the inductor coil.

Figure 18:
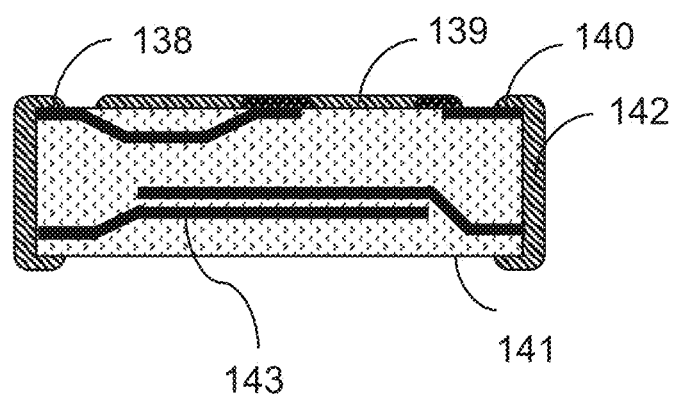
FIG. 18 provides a schematic diagram of a ceramic microelectronic device with end termination incorporating an inductor and a capacitor in accordance with certain embodiments.

In several embodiments, mounting to an external circuit may be made easier by terminating the ends of the device with a conductive paste. In some embodiments, both top and bottom surfaces of the device may be used for additional or duplicate components to be included. A microelectronic device with continuous electrodes on both sides of the device and one electrode connecting an electronic component in accordance with an embodiment of the invention is shown in FIG. 18. In some such embodiments a device with an electrode (138) that bends inside the ceramic body (141) and back again to the top surface creating a tunnel bypassing a component (139) on the top surface of the device is provided. The outside component is connected to a pad (140) at one edge of the device and the center of the component is connected to a pad at the other edge of the device by the continuous electrode containing the double bend (138). Side termination (142) on both sides of microelectronic devices are added to enable other internal electronic components and/or electrodes to connect with the bent electrodes. A capacitor (143) formed with bent electrodes inside ceramic body (141) is located on the opposite side of the microelectronic device.

Figure 19A:
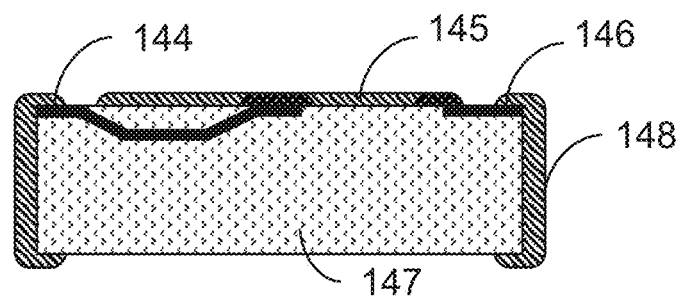
FIGS. 19A-19B provide schematics diagrams of end termination in an inductor (19A) and castellation (19B) in ceramic microelectronic devices in accordance with certain embodiments.

In some embodiments, an electronic component can be printed on the top surface or internally within the ceramic body. Mounting to an external circuit may be made easier by terminating the ends of the device with a conductive paste in accordance with several embodiments. A microelectronic device with bent electrode connecting an outside electronic component and side termination in accordance with an embodiment of the invention is shown in FIG. 19A. In some such embodiments, a device with an electrode (144) that bends inside the ceramic body (147) and back again to the top surface creating a tunnel bypassing a component (145) on the top surface of the device is provided. The outside component is connected to a pad (146) at one edge of the device and the center of the component is connected to a pad at the other edge of the device by the continuous electrode containing the double bend (144). Side termination (148) on both sides of microelectronic devices are added to enable other internal electronic components or electrodes to connect with the bent electrodes.

Figure 19B:
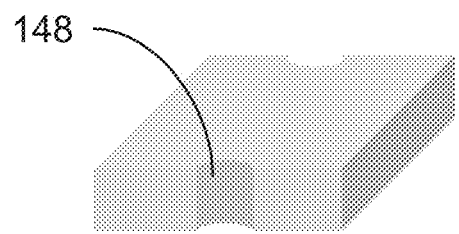

In various embodiments, castellation mounting holes can be added to microelectronic devices to allow for connection to further structures within the devices. Castellation that can be mounted to the side of microelectronic devices in accordance with an embodiment of the invention is shown in FIG. 19B. A castellation hole (148) allows for the connection to further structures within the device such as a multi-layer ceramic capacitor.

Figure 20:
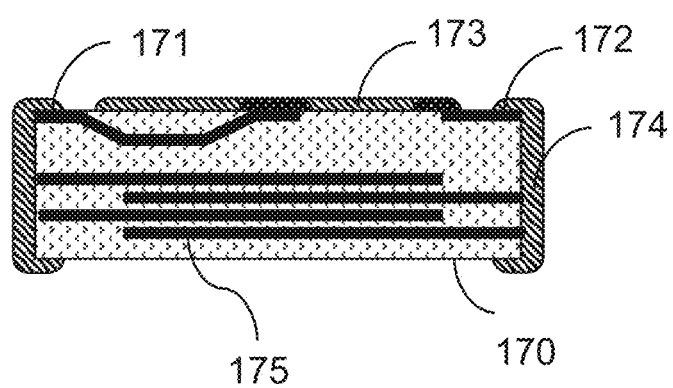
FIG. 20 provides a schematic diagram of a ceramic microelectronic device incorporating an inductor with end termination and a multilayer capacitor in accordance with certain embodiments.

A microelectronic device with side termination and/or castellation that allows for connection to a multi-layer capacitor in accordance with an embodiment of the invention is shown in FIG. 20. In some such embodiments, a device with an electrode (171) that bends inside the ceramic body (170) and back again to the top surface creating a tunnel bypassing a component (173) on the top surface of the device is provided. The outside component is connected to a pad (172) at one edge of the device and the center of the component is connected to a pad at the other edge of the device by the continuous electrode containing the double bend (171). Side termination and/or castellation (174) on both sides of microelectronic devices are added to enable other internal electronic components to connect with the bent electrodes. A multilayer capacitor (175) formed inside ceramic body (170) is located on the opposite side of the microelectronic device.

Figure 21:
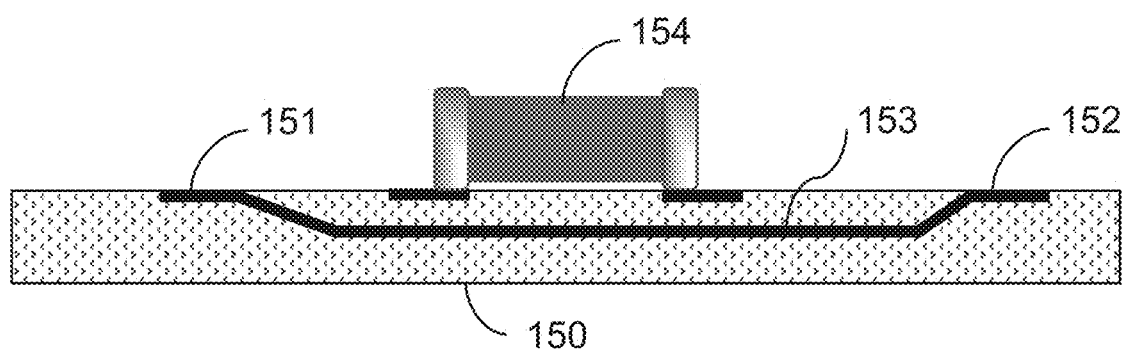
FIG. 21 provides a schematic diagram of a ceramic microelectronic device with a continuous conductor with two bent electrodes to bypass an electrical component in accordance with certain embodiments.

In many embodiments, bent electrodes may also be used on a ceramic substrate acting as a circuit substrate where via technology would normally be used to connect devices together and/or to signal lines, voltage supply and ground strips. In some embodiments, surface mount devices can be soldered, die bonded or attached using wire bonds. A microelectronic device with bent electrodes bypassing an electronic component in accordance with an embodiment of the invention is shown in FIG. 21. In some such embodiments, a device with a ceramic circuit board (150) is provided. A continuous conductor with two bends (153) allows an electrical connection between pads (151) and (152). The continuous conductor (153) is bypassing another component on the board (154).

Figure 22:
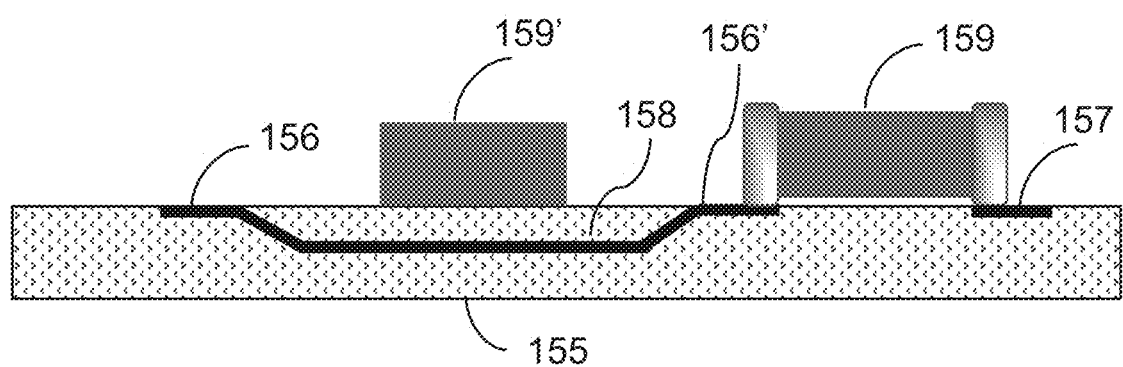
FIG. 22 provides a schematic diagram of a ceramic microelectronic device with a continuous conductor with two bent electrodes to bypass an electrical component and connect with another electrical component in accordance with certain embodiments.

A microelectronic device with bent electrodes bypassing an electronic component in a different construction in accordance with an embodiment of the invention is shown in FIG. 22. In some such embodiments, a device with a ceramic circuit board (155) is provided. A continuous conductor with two bends (158) allows an electrical connection between pads (156) and (156'). The continuous conductor (158) is connecting with an outside component (159) between pad (156') and an outside pad (157). The continuous conductor (158) is bypassing another outside component on the board (159') due to the tunnel formed by the bent electrode.

Figure 23:
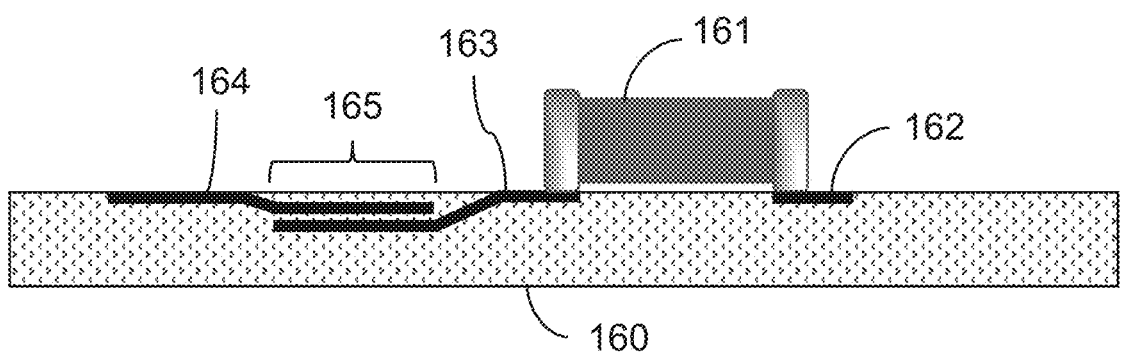
FIG. 23 provides a schematic diagram of a ceramic microelectronic device with an electrical component and a decoupling capacitor in accordance with certain embodiments.

In some embodiments, bent electrodes would also allow passive devices such as decoupling capacitors to be easily buried in the ceramic substrate. A microelectronic device with bent electrodes forming a decoupling capacitor when connecting with an outside electronic component in accordance with an embodiment of the invention is shown in FIG. 23. In some such embodiments, a device with a ceramic circuit board (160) is provided. A component (161) is mounted to the circuit by a simple conductive trace (162) on one side. A continuous conductor (163) forms both a pad for the other connection to the component and extends into the circuit board some distance. A second bent continuous electrode (164) forms both an external conductive pad and also extends into the circuit board some distance. Overlapping the first bent electrode (163) and the second bent electrode (164) by some distance (165), which creates a decoupling capacitor.

Figure 24A:
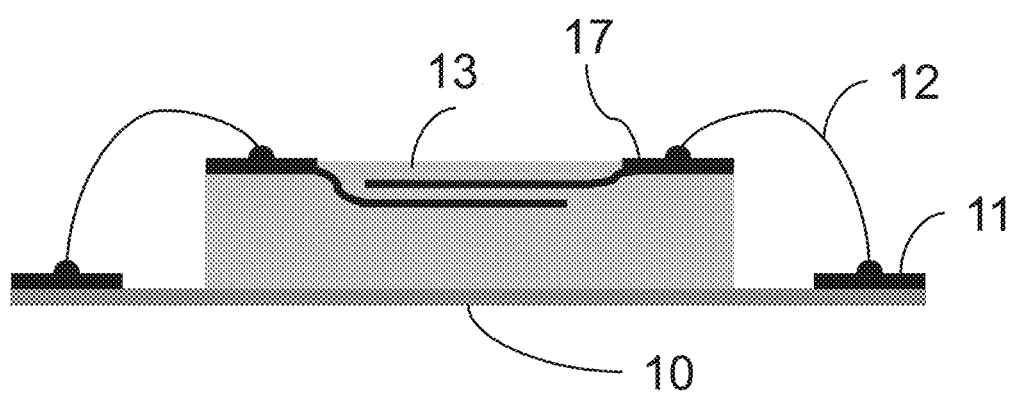
FIGS. 24A-24B provide schematics diagrams of interconnection of microelectronic devices to circuits in accordance with certain embodiments.
Figure 24B:
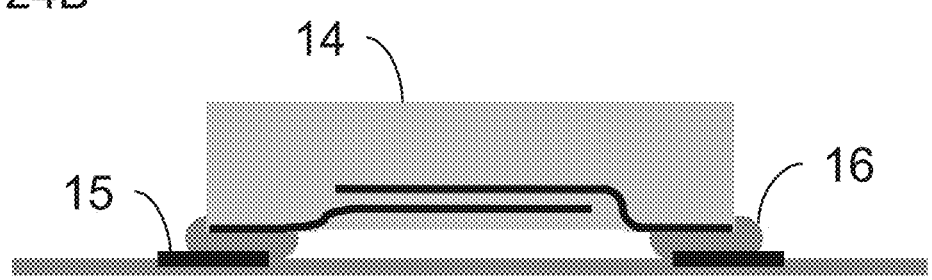

In several embodiments, microelectronic devices can be wire bonded, solder attached and/or die bonded to connect to outside circuits. The continuous electrodes may eliminate the risk of electrical failure due to poor connection of via to electrode. Many embodiments include that since the conductive pads as part of the continuous electrodes have no topography associate with an underlying via and as such are ideal for wire bonding, solder attachment, and/or die bonding. FIG. 24A illustrates a microelectronic device with continuous electrodes that can be wire bonded with an external circuit in accordance with an embodiment. In some such embodiments, a device with bent electrode (13) is deposited on a substrate (10) is provided. The contact pads (17) on the surface of the device can be wire bonded (12) to external contact pads located on the substrate (10). Alternatively, the contact pads (17) can be die bonded (11) to external contact pads. FIG. 24B illustrates a microelectronic device with continuous electrodes that can be solder attached and die attached with an external circuit in accordance with an embodiment of the invention. In some such embodiments, a device with bent electrodes on the bottom side (14) can be connected with outside contact pads via solder attachment (16) and/or die bonding (15) is provided.

Although the capacitors in accordance with many embodiments may incorporate any suitable combination of dielectric material and conductive material, in various embodiments, exemplary dielectrics include, but are not limited to, P100, NPO, X7R, YSV, among others. Similarly, any suitable conductive material may be incorporated, including, for example, any compatible metallization material. In addition, as discussed above, these dielectric and conductive layers may be provided in any thickness suitable to provide the desired capacitance. In various embodiments, the minimum thickness of the substrates is only limited by the particle size of the ceramic material used and the ability to disperse this ceramic into a polymer binder system. In some embodiments, the limiting factor to the thinness of the dielectric layer would be voltage breakdown and possibly arcing between the conductors.

Although specific embodiments of microelectronic devices are described herein, it will be understood that many alternative embodiments may be made that incorporate the capabilities described herein, and/or may be made in accordance with methods of manufacture.

Doctrine of Equivalents

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A microelectronic device comprising:
a dielectric body forming a monolithic structure;
at least a first conductor formed of a first continuous member of conductive material, the at least first conductor comprising at least a first conductive layer having at least a first portion embedded within the monolithic structure of the dielectric body and extending across at least a portion of the dielectric body along a first plane within the dielectric body such that some portion of the dielectric material forming the dielectric body encompasses said first portion, and a second portion continuously interconnected with the first portion via a connecting portion, the second portion extending along a second plane parallel to the first plane;
wherein the second portion is either exposed to a top surface of the dielectric body or embedded within the monolithic structure of the dielectric body such that some portion of the dielectric material forming the dielectric body encompasses said second portion;
wherein the connecting portion is formed of a bent portion of the first continuous member of conductive material, and wherein the connecting portion is not perpendicular to the first portion or the second portion of the first conductive layer;
at least a second conductive layer on the top surface of the dielectric body parallel to the first or second portion of the first conductive layer, such that some portion of the dielectric material forming the monolithic structure of the dielectric body is disposed therebetween and defines a layer of dielectric material having a dielectric thickness; and
a conductive paste deposited at a left side and a right side of the microelectronic device, wherein the conductive paste overlaps partially with the top surface and a bottom surface of the dielectric body, wherein the bottom surface is opposite to the top surface.

2. A microelectronic device comprising:
a dielectric body forming a monolithic structure;
at least a first conductor formed of a first continuous member of conductive material, the at least first conductor comprising at least a first conductive layer having at least a first portion embedded within the monolithic structure of the dielectric body and extending across at least a portion of the dielectric body along a first plane within the dielectric body such that some portion of the dielectric material forming the dielectric body encompasses said first portion, and a second portion continuously interconnected with the first portion via a connecting portion, the second portion extending along a second plane parallel to the first plane;
wherein the second portion is either exposed to a top surface of the dielectric body or embedded within the monolithic structure of the dielectric body such that some portion of the dielectric material forming the dielectric body encompasses said second portion;
wherein the connecting portion is formed of a bent portion of the first continuous member of conductive material, and wherein the connecting portion is not perpendicular to the first portion or the second portion of the first conductive layer;
at least a second conductor formed of a second continuous member of conductive material, that at least second conductor comprising at least a second conductive layer having at least a first portion embedded within the monolithic structure of the dielectric body and extending across at least a portion of the dielectric body along a third plane within the dielectric body such some portion of the dielectric material forming the dielectric body encompasses said first portion, and a second portion continuously interconnected with the first portion via a second conductive layer connecting portion, the second portion being exposed to the top surface of the dielectric body extending along a fourth plane parallel to the first plane;
wherein the first portions of the first conductive layer and the second conductive layer are disposed parallel to each other within the dielectric body such that some portion of the dielectric material forming the monolithic structure of the dielectric body is disposed therebetween and defines a first dielectric thickness;
wherein the second conductive layer connecting portion is formed of a bent portion of the second continuous member of conductive material, and wherein the second conductive layer connecting portion is not perpendicular to the first portion or the second portion of the second conductive layer; and
a conductive paste deposited at a left side and a right side of the microelectronic device, wherein the conductive paste overlaps partially with the top surface and a bottom surface of the dielectric body, wherein the bottom surface is opposite to the top surface.

3. The microelectronic device of claim 2, further comprising:
at least an electronic component disposed on the top surface of the dielectric body and connecting with the second portion of the first conductive layer and the second portion of the second conductive layer.

4. The microelectronic device of claim 2, further comprising:
at least a third conductive layer on the top surface of the dielectric body parallel to the first portion of the first conductive layer and the first portion of the second conductive layer, wherein the third conductive layer overlaps with the second portion of the first conductive layer and is disposed parallel to the first portion of the second conductive layer such that some portion of the dielectric material forming the monolithic structure of the dielectric body is disposed between the first portion of the second conductive layer and the third conductive layer and defines a second dielectric thickness.

5. The microelectronic device of claim 1 or 2, further comprising:
at least a third conductive layer embedded within the monolithic structure of the dielectric body and extending along a third plane within the dielectric body and parallel to the first portion of the first conductive layer;
at least a fourth conductive layer embedded within the monolithic structure of the dielectric body and extending along a fourth plane within the dielectric body and parallel to the first portion of the first conductive layer;
wherein the third and the fourth conductive layers are disposed parallel to each other within the dielectric body such that some portion of the dielectric material forming the monolithic structure of the dielectric body is disposed therebetween and defines a second dielectric thickness; and
wherein the conductive layers are connected by the conductive paste.

6. The microelectronic device of claim 2, further comprising:
at least a third conductive layer on the top surface of the dielectric body, such that the second portions of the first and the second conductive layers and the third conductive layer are on the same top surface; and
wherein an electronic component is deposited on the top surface of the dielectric body and connected with the second portion of the first conductive layer and the third conductive layer.

7. The microelectronic device of claim 2, wherein the second portions of the first and second conductive layers are independently wire-bonded to a portion of a circuit.

8. A microelectronic device comprising:
a dielectric body forming a monolithic structure;
at least a first conductor formed of a first continuous member of conductive material, the at least first conductor comprising at least a first conductive layer having at least a first portion embedded within the monolithic structure of the dielectric body and extending across at least a portion of the dielectric body along a first plane within the dielectric body such that some portion of the dielectric material forming the dielectric body encompasses said first portion, and a second portion continuously interconnected with the first portion via a connecting portion, the second portion extending along a second plane parallel to the first plane;
wherein the second portion is either exposed to a top surface of the dielectric body or embedded within the monolithic structure of the dielectric body such that some portion of the dielectric material forming the dielectric body encompasses said second portion;
wherein the connecting portion is formed of a bent portion of the first continuous member of conductive material, and wherein the connecting portion is not perpendicular to the first portion or the second portion of the first conductive layer;
at least a second conductive layer on the top surface of the dielectric body parallel to the first or second portion of the first conductive layer, such that some portion of the dielectric material forming the monolithic structure of the dielectric body is disposed therebetween and defines a layer of dielectric material having a dielectric thickness;
at least a third conductor formed of a third continuous member of conductive material, the at least third conductor comprising at least a third conductive layer having at least a first portion embedded within the monolithic structure of the dielectric body and extending across at least a portion of the dielectric body along a third plane within the dielectric body such that some portion of the dielectric material forming the monolithic structure of the dielectric body encompasses said first portion, and a second portion continuously interconnected with the first portion via a third conductive layer connecting portion, the second portion being exposed to a bottom surface of the dielectric body in a fourth plane parallel to the third plane, wherein the bottom surface is opposite to the top surface;
at least a fourth conductive layer on the bottom surface of the dielectric body parallel to the first portion of the third conductive layer, such that some portion of the dielectric material forming the monolithic structure of the dielectric body is disposed therebetween and defines a second dielectric thickness; and
wherein the third conductive layer connecting portion is formed of a bent portion of the third continuous member of conductive material, and wherein the third conductive layer connecting portion is not perpendicular to the first portion or the second portion of the third conductive layer.

9. A microelectronic device comprising:
a dielectric body forming a monolithic structure;
at least a first conductor formed of a first continuous member of conductive material, the at least first conductor comprising at least a first conductive layer having at least a first portion embedded within the monolithic structure of the dielectric body and extending across at least a portion of the dielectric body along a first plane within the dielectric body such that some portion of the dielectric material forming the dielectric body encompasses said first portion, and a second portion continuously interconnected with the first portion via a connecting portion, the second portion extending along a second plane parallel to the first plane;
wherein the second portion is either exposed to a top surface of the dielectric body or embedded within the monolithic structure of the dielectric body such that some portion of the dielectric material forming the dielectric body encompasses said second portion;
wherein the connecting portion is formed of a bent portion of the first continuous member of conductive material, and wherein the connecting portion is not perpendicular to the first portion or the second portion of the first conductive layer;
at least a second conductor formed of a second continuous member of conductive material, that at least second conductor comprising at least a second conductive layer having at least a first portion embedded within the monolithic structure of the dielectric body and extending across at least a portion of the dielectric body along a third plane within the dielectric body such some portion of the dielectric material forming the dielectric body encompasses said first portion, and a second portion continuously interconnected with the first portion via a second conductive layer connecting portion, the second portion being exposed to the top surface of the dielectric body extending along a fourth plane parallel to the first plane;
wherein the first portions of the first conductive layer and the second conductive layer are disposed parallel to each other within the dielectric body such that some portion of the dielectric material forming the monolithic structure of the dielectric body is disposed therebetween and defines a first dielectric thickness;
wherein the second conductive layer connecting portion is formed of a bent portion of the second continuous member of conductive material, and wherein the second conductive layer connecting portion is not perpendicular to the first portion or the second portion of the second conductive layer;
at least a third conductor formed of a third continuous member of conductive material, the at least third conductor comprising at least a third conductive layer having at least a first portion embedded within monolithic structure of the dielectric body and extending across at least a portion of the dielectric body along a fifth plane within the dielectric body such that some portion of the dielectric material forming monolithic structure of the dielectric body encompasses said first portion of the third conductive layer, and a second portion of the third conductive layer continuously interconnected with the first portion via a third conductive layer connecting portion, the second portion of the third conductive layer being exposed to a bottom surface of the dielectric body in a sixth plane parallel to the fifth plane, wherein the bottom surface is opposite to the top surface;

at least a fourth conductor formed of a fourth continuous member of conductive material, the at least fourth conductor comprising at least a fourth conductive layer having at least a first portion embedded within the monolithic structure of the dielectric body and extending across at least a portion of the dielectric body along a seventh plane within the dielectric body such that some portion of the dielectric material forming the monolithic structure of the dielectric body covers said first portion of the fourth conductive layer, and a second portion of the fourth conductive layer continuously interconnected with the first portion of the fourth conductive layer via a fourth conductive layer connecting portion, the second portion of the fourth conductive layer being exposed to the bottom surface of the dielectric body in an eighth plane parallel to the seventh plane;

wherein the fifth and seventh planes of the third conductive layer and fourth conductive layer are disposed parallel to each other within the monolithic structure of the dielectric body such that some portion of the dielectric material forming the monolithic structure of the dielectric body is disposed therebetween and defines a second dielectric thickness; and wherein the fourth conductive layer connecting portion is formed of a bent portion of the fourth continuous member of conductive material, and wherein the fourth conductive layer connecting portion is not perpendicular to the first portion or the second portion of the fourth conductive layer.

10. A microelectronic device comprising:
a dielectric body forming a monolithic structure;
at least a first conductor formed of a first continuous member of conductive material, the at least first conductor comprising at least a first conductive layer having at least a first portion embedded within the monolithic structure of the dielectric body and extending across at least a portion of the dielectric body along a first plane within the dielectric body such that some portion of the dielectric material forming the dielectric body encompasses said first portion, and a second portion continuously interconnected with the first portion via a connecting portion, the second portion extending along a second plane parallel to the first plane;
wherein the second portion is either exposed to a top surface of the dielectric body or embedded within the monolithic structure of the dielectric body such that some portion of the dielectric material forming the dielectric body encompasses said second portion; and
wherein the connecting portion is formed of a bent portion of the first continuous member of conductive material, and wherein the connecting portion is not perpendicular to the first portion or the second portion of the first conductive layer;
at least a second conductor formed of a second continuous member of conductive material, the at least second conductor comprising at least a second conductive layer having at least a first portion embedded within monolithic structure of the dielectric body and extending across at least a portion of the dielectric body along a third plane within the dielectric body such that some portion of the dielectric material forming the monolithic structure of the dielectric body encompasses said first portion, and a second portion continuously interconnected with the first portion via a second conductive layer first connecting portion, the second portion being exposed to a bottom surface of the dielectric body in a fourth plane parallel to the third plane, and a third portion continuously interconnected with the first portion via a second conductive layer second connecting portion and embedded within the monolithic structure of the dielectric body and extending across at least a portion of the dielectric body along a fifth plane within the dielectric body such that some portion of the dielectric material forming the monolithic structure of the dielectric body encompasses said the third portion, wherein the bottom surface is opposite to the top surface;

wherein the first portion of the first conductive layer and the third portion of the second conductive layer are disposed parallel to each other within the monolithic structure of the dielectric body such that some portion of the dielectric material forming the monolithic structure of the dielectric body is disposed between the first portion of the first conductive layer and third portion of the second conductive layer and defines a first dielectric thickness, and the first and third portions of the second conductive layer are disposed parallel to each other within the dielectric body such that some portion of the dielectric material forming the monolithic structure of the dielectric body is disposed between the first and third portions of the second conductive layer and defines a second dielectric thickness; and wherein the second conductive layer first connecting portion and second conductive layer second connecting portion are formed of bent portions of the second continuous member of conductive material, and wherein the second conductive layer connecting portions are not perpendicular to the first, second or third portions of the second conductive layer.

11. A microelectronic device comprising:
a dielectric body forming a monolithic structure;
at least a first conductor formed of a first continuous member of conductive material, the at least first conductor comprising at least a first conductive layer having at least a first portion embedded within the monolithic structure of the dielectric body and extending across at least a portion of the dielectric body along a first plane within the dielectric body such that some portion of the dielectric material forming the dielectric body encompasses said first portion, and a second portion continuously interconnected with the first portion via a connecting portion, the second portion extending along a second plane parallel to the first plane;
wherein the second portion is either exposed to a top surface of the dielectric body or embedded within the monolithic structure of the dielectric body such that some portion of the dielectric material forming the dielectric body encompasses said second portion; and
wherein the connecting portion is formed of a bent portion of the first continuous member of conductive material, and wherein the connecting portion is not perpendicular to the first portion or the second portion of the first conductive layer;

at least a third portion of the first conductive layer continuously interconnected with the first portion via a first conductive layer second connecting portion and embedded within the monolithic structure of the dielectric body and extending across at least a portion of the dielectric body along a third plane within the dielectric body such that some portion of the dielectric material forming the dielectric body encompasses the third portion;

at least a second conductor formed of a second continuous member of conductive material, the at least second conductor comprising at least a second conductive layer having at least a first portion embedded within monolithic structure of the dielectric body and extending across at least a portion of the dielectric body along a fourth plane within the dielectric body such that some portion of the dielectric material forming the monolithic structure of the dielectric body encompasses said first portion, and a second portion continuously interconnected with the first portion via a second conductive layer first connecting portion, the second portion being exposed to a bottom surface of the dielectric body in a fifth plane parallel to the fourth plane, and a third portion continuously interconnected with the first portion via a second conductive layer second connecting portion and embedded within the monolithic structure of the dielectric body and extending across at least a portion of the dielectric body along a sixth plane within the dielectric body such that some portion of the dielectric material forming the monolithic structure of the dielectric body encompasses said the third portion, wherein the bottom surface is opposite to the top surface;

wherein the first and third portions of the first conductive layer are disposed parallel to each other within monolithic structure of the dielectric body such that some portion of the dielectric material forming the monolithic structure of the dielectric body is disposed between the first and third portions of the first conductive layer and defines a first dielectric thickness, and the first and third portions of the second conductive layer are disposed parallel to each other within the dielectric body such that some portion of the dielectric material forming the monolithic structure of the dielectric body is disposed between the first and third portions of the second conductive layer and defines a second dielectric thickness, and the third portions of the first conductive layer and the second conductive layer are disposed parallel to each other within the dielectric body such that some portion of the dielectric material forming the monolithic structure of the dielectric body is disposed between the third portions of the first conductive layer and the second conductive layer and defines a third dielectric thickness; and wherein the first conductive layer second connecting portion is formed of a bent portion of the first continuous member of conductive material, and wherein the second conductive layer first connecting portion and second conductive layer second connecting portion are formed of bent portions of the second continuous member of conductive material, and wherein the first conductive layer second connecting portion are not perpendicular to the first, second or third portions of the first conductive layer, and the second conductive layer connecting portions are not perpendicular to the first, second or third portions of the second conductive layer.

12. A microelectronic device comprising:
a dielectric body forming a monolithic structure;
at least a first conductor formed of a first continuous member of conductive material, the at least first conductor comprising at least a first conductive layer having at least a first portion embedded within the monolithic structure of the dielectric body and extending across at least a portion of the dielectric body along a first plane within the dielectric body such that some portion of the dielectric material forming the dielectric body encompasses said first portion, and a second portion continuously interconnected with the first portion via a connecting portion, the second portion extending along a second plane parallel to the first plane;
wherein the second portion is either exposed to a top surface of the dielectric body or embedded within the monolithic structure of the dielectric body such that some portion of the dielectric material forming the dielectric body encompasses said second portion; and
wherein the connecting portion is formed of a bent portion of the first continuous member of conductive material, and wherein the connecting portion is not perpendicular to the first portion or the second portion of the first conductive layer;
at least a third portion of the first conductive layer continuously interconnected with the first portion via a second connecting portion, the third portion being exposed to the top surface of the dielectric body in the second plane; and
wherein the second connecting portion is formed of a bent portion of the first continuous member of conductive material, and wherein the connecting portion is not perpendicular to the first, second or third portions of the first conductive layer.

13. The microelectronic device of claim 12, further comprising:
at least a second conductive layer on the top surface of the dielectric body, such that the second and third portions of the first conductive layer and the second conductive layer are on the same top surface; and
wherein an electronic component is deposited on the top surface of the dielectric body and connected with the third portion of the first conductive layer and the second conductive layer.

14. The microelectronic device of claim 13, wherein the electronic component is an inductor.

15. The microelectronic device of claim 12, further comprising:
at least a second and a third conductive layer on the top surface of the dielectric body, such that the second and third portions of the first conductive layer and the second and third conductive layers are on the same top surface; and
wherein an electronic component is deposited on the top surface of the dielectric body and connected with the second and third conductive layers.

16. A microelectronic device comprising:
a dielectric body;
at least a first conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion via a connecting portion, the second portion is in a second plane parallel to the first plane, wherein the second portion is either exposed to a top surface of the dielectric body or embedded within the dielectric body;

at least a second conductive layer on the top surface of the dielectric body parallel to the first plane of the first conductive layer, such that a layer of dielectric material is disposed therebetween and defines a dielectric thickness;

a conductive paste deposited at a left side and a right side of the microelectronic device, wherein the conductive paste overlaps partially with the top surface and a bottom surface of the dielectric body, wherein the bottom surface is opposite to the top surface;

wherein the connecting portion is not perpendicular to the first portion or the second portion; and wherein the dielectric body is a monolithic structure.

17. The microelectronic device of claim 16, further comprising:

at least a third conductive layer embedded within the dielectric body and extending along a first plane within the dielectric body and parallel to the first portion of the first conductive layer;

at least a fourth conductive layer embedded within the dielectric body and extending along a first plane within the dielectric body and parallel to the first portion of the first conductive layer;

wherein the third and the fourth conductive layers are disposed parallel to each other within the dielectric body such that a layer of dielectric material is disposed therebetween and defines a dielectric thickness; and wherein the conductive layers are connected by the conductive paste.

18. A microelectronic device comprising:

a dielectric body;

at least a first conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion via a connecting portion, the second portion is in a second plane parallel to the first plane, wherein the second portion is either exposed to a top surface of the dielectric body or embedded within the dielectric body;

at least a second conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to the top surface of the dielectric body in a second plane parallel to the first plane;

a conductive paste deposited at a left side and a right side of the microelectronic device, wherein the conductive paste overlaps partially with the top surface and a bottom surface of the dielectric body, wherein the bottom surface is opposite to the top surface;

wherein the first planes of the first conductive layer and second conductive layer are disposed parallel to each other within the dielectric body such that a layer of dielectric material is disposed therebetween and defines a dielectric thickness;

wherein the connecting portion is not perpendicular to the first portion or the second portion; and wherein the dielectric body is a monolithic structure.

19. The microelectronic device of claim 18, further comprising:

at least a third conductive layer embedded within the dielectric body and extending along a first plane within the dielectric body and parallel to the first portion of the first conductive layer;

at least a fourth conductive layer embedded within the dielectric body and extending along a first plane within the dielectric body and parallel to the first portion of the first conductive layer;

wherein the third and the fourth conductive layers are disposed parallel to each other within the dielectric body such that a layer of dielectric material is disposed therebetween and defines a dielectric thickness; and wherein the conductive layers are connected by the conductive paste.

20. A microelectronic device comprising:

a dielectric body;

at least a first conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion via a connecting portion, the second portion is in a second plane parallel to the first plane, wherein the second portion is either exposed to a top surface of the dielectric body or embedded within the dielectric body;

at least a second conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to the top surface of the dielectric body in a second plane parallel to the first plane;

at least a third conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to a bottom surface of the dielectric body in a second plane parallel to the first plane, wherein the bottom surface is opposite to the top surface;

at least a fourth conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to the bottom surface of the dielectric body in a second plane parallel to the first plane; and wherein the first planes of the third conductive layer and fourth conductive layer are disposed parallel to each other within the dielectric body such that a layer of dielectric material is disposed therebetween and defines a dielectric thickness, wherein the first planes of the first conductive layer and second conductive layer are disposed parallel to each other within the dielectric body such that a layer of dielectric material is disposed therebetween and defines a dielectric thickness;

wherein the connecting portion is not perpendicular to the first portion or the second portion; and wherein the dielectric body is a monolithic structure.

21. A microelectronic device comprising:
a dielectric body;
at least a first conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion via a connecting portion, the second portion is in a second plane parallel to the first plane, wherein the second portion is either exposed to a top surface of the dielectric body or embedded within the dielectric body;
at least a second conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to a bottom surface of the dielectric body in a second plane parallel to the first plane, and a third portion continuously interconnected with the first portion and embedded within the dielectric body and extending across at least a portion of the dielectric body along a third plane within the dielectric body such a portion of the dielectric material forming the dielectric body covers said the third portion, wherein the bottom surface is opposite to the top surface;
wherein the first portion of the first conductive layer and the third portion of the second conductive layer are disposed parallel to each other within the dielectric body such that a layer of dielectric material is disposed between the first portion of the first conductive layer and third portion of the second conductive layer and defines a first dielectric thickness, and the first and third portions of the second conductive layer are disposed parallel to each other within the dielectric body such that a layer of dielectric material is disposed between the first and third portions of the second conductive layer and defines a second dielectric thickness;
wherein the connecting portion is not perpendicular to the first portion or the second portion; and
wherein the dielectric body is a monolithic structure.

22. A microelectronic device comprising:
a dielectric body;
at least a first conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion via a connecting portion, the second portion is in a second plane parallel to the first plane, wherein the second portion is either exposed to a top surface of the dielectric body or embedded within the dielectric body;
at least a third portion of the first conductive layer continuously interconnected with the first portion and embedded within the dielectric body and extending across at least a portion of the dielectric body along a third plane within the dielectric body such a portion of the dielectric material forming the dielectric body covers said the third portion;
at least a second conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion, the second portion being exposed to a bottom surface of the dielectric body in a second plane parallel to the first plane, and a third portion continuously interconnected with the first portion and embedded within the dielectric body and extending across at least a portion of the dielectric body along a third plane within the dielectric body such a portion of the dielectric material forming the dielectric body covers said the third portion, wherein the bottom surface is opposite to the top surface;
wherein the first and third portions of the first conductive layer are disposed parallel to each other within the dielectric body such that a layer of dielectric material is disposed between the first and third portions of the first conductive layer and defines a first dielectric thickness, and the first and third portions of the second conductive layer are disposed parallel to each other within the dielectric body such that a layer of dielectric material is disposed between the first and third portions of the second conductive layer and defines a second dielectric thickness, and the third portions of the first conductive layer and the second conductive layer are disposed parallel to each other within the dielectric body such that a layer of dielectric material is disposed between the third portions of the first conductive layer and the second conductive layer and defines a third dielectric thickness;
wherein the connecting portion is not perpendicular to the first portion or the second portion; and
wherein the dielectric body is a monolithic structure.

23. A microelectronic device comprising:
a dielectric body;
at least a first conductive layer having at least a first portion embedded within the dielectric body and extending across at least a portion of the dielectric body along a first plane within the dielectric body such a portion of the dielectric material forming the dielectric body covers said first portion, and a second portion continuously interconnected with the first portion via a connecting portion, the second portion is in a second plane parallel to the first plane, wherein the second portion is either exposed to a top surface of the dielectric body or embedded within the dielectric body;
at least a third portion of the first conductive layer continuously interconnected with the first portion, the third portion being exposed to the top surface of the dielectric body in the second plane;
wherein the connecting portion is not perpendicular to the first portion or the second portion; and
wherein the dielectric body is a monolithic structure.

24. The microelectronic device of claim 23, further comprising:

at least a second conductive layer on the top surface of the dielectric body, such that the second and third portions of the first conductive layer and the second conductive layer are on the same top surface;

wherein an electronic component is deposited on the top surface of the dielectric body and connected with the third portion of the first conductive layer and the second conductive layer.

25. The microelectronic device of claim 24, wherein the electronic component is an inductor.

26. The microelectronic device of claim 23, further comprising:

at least a second and a third conductive layer on the top surface of the dielectric body, such that the second and third portions of the first conductive layer and the second and third conductive layers are on the same top surface;

wherein an electronic component is deposited on the top surface of the dielectric body and connected with the second and third conductive layers.

* * * * *